(12) United States Patent
Kim et al.

(10) Patent No.: US 12,025,801 B2
(45) Date of Patent: Jul. 2, 2024

(54) OPTICAL LENS ASSEMBLY AND ELECTRONIC DEVICE INCLUDING SAME

(71) Applicant: Samsung Electronics Co., Ltd., Gyeonggi-do (KR)

(72) Inventors: Dongwoo Kim, Gyeonggi-do (KR); Junghyun Lee, Gyeonggi-do (KR); Minki Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 17/263,937

(22) PCT Filed: Aug. 1, 2019

(86) PCT No.: PCT/KR2019/009603
§ 371 (c)(1),
(2) Date: Jan. 28, 2021

(87) PCT Pub. No.: WO2020/027597
PCT Pub. Date: Feb. 6, 2020

(65) Prior Publication Data
US 2021/0157153 A1 May 27, 2021

(30) Foreign Application Priority Data
Aug. 3, 2018 (KR) .................... 10-2018-0090900

(51) Int. Cl.
*G02B 27/01* (2006.01)
*G02B 7/02* (2021.01)

(52) U.S. Cl.
CPC .......... *G02B 27/0172* (2013.01); *G02B 7/02* (2013.01); *G02B 27/0176* (2013.01); *G02B 2027/0138* (2013.01); *G02B 2027/0178* (2013.01)

(58) Field of Classification Search
CPC .............. G02B 27/017; G02B 27/0101; G02B 27/0172; G02B 27/0176; G02B 27/0178;
(Continued)

(56) References Cited

U.S. PATENT DOCUMENTS 5,436,765 A 7/1995 Togino
5,654,827 A * 8/1997 Reichert ............ G02B 27/0101
359/640

(Continued)

FOREIGN PATENT DOCUMENTS

JP 2013-210587 A 10/2013
JP 2015-075713 A 4/2015
(Continued)

OTHER PUBLICATIONS

Korean Office Action dated Apr. 6, 2023.
Korean Decision to Refuse dated Sep. 21, 2023.
Korean Office Action dated Jan. 8, 2024.

*Primary Examiner* — Sultan Chowdhury
(74) *Attorney, Agent, or Firm* — Cha & Reiter, LLC

(57) ABSTRACT

Provided is an optical lens assembly and an electronic apparatus having the optical lens assembly.
In the optical lens assembly for an electronic apparatus, which is worn by a user to see an image generated from a display, the optical lens assembly includes at least one negative lens and at least one positive lens arranged along an optical axis of the image, and a flat semi-transparent mirror reflecting image light generated from the display and transmitting external real image light, in which each of the at least one negative lens and the at least one positive lens is a rotationally symmetric lens with respect to the optical axis.

13 Claims, 23 Drawing Sheets

(58) Field of Classification Search
CPC ...... G02B 27/0189; G02B 27/09; G02B 7/00;
G02B 7/002; G02B 7/02; G02B 7/021;
G02B 7/343; G02B 13/00; G02B
13/0015; G02B 13/002; G02B 13/0045;
G02B 13/0065
See application file for complete search history.

(56) References Cited

U.S. PATENT DOCUMENTS

| | | | |
|---|---|---|---|
| 6,041,186 A * | 3/2000 | Sensui | G02B 7/28 |
| | | | 396/141 |
| 8,810,880 B2 | 8/2014 | Hamano et al. | |
| 9,268,139 B2 | 2/2016 | Magyari | |
| 9,632,315 B2 | 4/2017 | Smith et al. | |
| 2001/0021068 A1 * | 9/2001 | Togino | H04N 5/7408 |
| | | | 348/E5.145 |
| 2003/0107785 A1 * | 6/2003 | Takeyama | G02B 27/0172 |
| | | | 359/15 |
| 2006/0098293 A1 | 5/2006 | Garoutte et al. | |
| 2010/0246022 A1 * | 9/2010 | Matsumoto | G02C 9/04 |
| | | | 359/630 |
| 2012/0120498 A1 * | 5/2012 | Harrison | G06F 3/012 |
| | | | 359/630 |
| 2015/0103411 A1 | 4/2015 | Katagata | |
| 2016/0041390 A1 | 2/2016 | Poon et al. | |
| 2016/0085075 A1 | 3/2016 | Cheng et al. | |
| 2017/0075096 A1 | 3/2017 | Shi et al. | |
| 2017/0311794 A1 | 11/2017 | Inoue et al. | |
| 2017/0371147 A1 * | 12/2017 | Cao | G02B 13/002 |

FOREIGN PATENT DOCUMENTS

| | | |
|---|---|---|
| KR | 10-2005-0005823 A | 1/2005 |
| KR | 10-2015-0020801 A | 2/2015 |
| KR | 10-2017-0039294 A | 4/2017 |
| KR | 10-2017-0129258 A | 11/2017 |

* cited by examiner

OPTICAL LENS ASSEMBLY AND ELECTRONIC DEVICE INCLUDING SAME

CROSS REFERENCE TO RELATED APPLICATIONS

This application is a National Phase Entry of PCT International Application No. PCT/KR2019/009603, which was filed on Aug. 1, 2019, and claims a priority to Korean Patent Application No. 10-2018-0090900, which was filed on Aug. 3, 2018, the contents of which are incorporated herein by reference.

TECHNICAL FIELD

Various embodiments relate to an optical lens assembly and an electronic apparatus having the same, and more particularly, to an optical lens assembly, which is compact and is easy to manufacture, and an electronic apparatus having the optical lens assembly.

BACKGROUND ART

Recently, product development of related to augmented reality (AR) systems is actively conducted. As products used for military in the past have been applied to games, industrial applications, medical applications, automobiles, mobile phones, and the like, small and light-weighted products with good image quality are required. However, due to the use of many lenses to obtain images of good quality, it is difficult to configure a productive and compact system.

Head-mounted displays (HMDs) refer to various digital devices capable of providing multimedia contents by wearing a glasses-type display on the head. According to the trend of lightening and miniaturization of digital devices, various wearable computers have been developed, and HMDs also are widely used. Beyond a simple display function, HMDs may provide various convenient functions to a user by being combined with AR technology, N screen technology, and the like.

However, while miniaturization of an AR optical system is necessary to be worn like glasses, miniaturization is difficult and manufacturing of a lens is also difficult.

DESCRIPTION OF EMBODIMENTS

Technical Problem

Various embodiments may provide an optical lens assembly which is compact and easy to manufacture for use in an electronic apparatus, for example, a head-mounted electronic apparatus.

Furthermore, various embodiments may provide an electronic apparatus including, for example, an optical lens assembly.

Solution to Problem

According to an embodiment, an optical lens assembly for an electronic apparatus, the optical lens assembly being worn by a user to see an image generated from a display, includes at least one negative lens and at least one positive lens arranged along an optical axis of the image, and a flat semi-transparent mirror reflecting image light generated from the display and transmitting external real image light, wherein the flat semi-transparent mirror is disposed at a final position of a path of the image light generated from the display, one of the at least one positive lens is disposed closest to the flat semi-transparent mirror, and each of the at least one negative lens and the at least one positive lens is a rotationally symmetric lens with respect to the optical axis.

The optical lens assembly may satisfy a following inequality $$1 \le \left| \frac{T_{(S2-Si)}}{f} \right| \le 4, \qquad \text{<Inequality>}$$

wherein $T_{(S2-Si)}$ denotes a distance from the display to the flat semi-transparent mirror, and f denotes a focal length of the optical lens assembly.

The at least one negative lens and the at least one positive lens may each include a first positive lens, a second negative lens, and a third positive lens, which are arranged along the optical axis toward the flat semi-transparent mirror.

When an Abbe number of the second negative lens is V1, and an Abbe number of the third positive lens is V2, the optical lens assembly may satisfy a following inequality $$25 \le V1-V2 \le 40. \qquad \text{<Inequality>}$$

The first positive lens may be a biconvex lens, the second negative lens may have a meniscus shape convex toward the flat semi-transparent mirror, and the third positive lens may have an exit surface convex toward the flat semi-transparent mirror.

The at least one negative lens and the at least one positive lens may each include a first positive lens, a second negative lens, a third positive lens, and a fourth positive lens, which are arranged along the optical axis toward the flat semi-transparent mirror.

When an Abbe number of the second negative lens is V1, and an Abbe number of the fourth positive lens is V2, the optical lens assembly may satisfy a following inequality $$25 \le V1-V2 \le 40. \qquad \text{<Inequality>}$$

The first positive lens may include an exit surface convex toward the flat semi-transparent mirror, the second negative lens may be a biconcave lens, the third positive lens may have a meniscus shape convex toward the flat semi-transparent mirror, and the fourth positive lens may have an exit surface convex toward the flat semi-transparent mirror.

According to another embodiment, an electronic apparatus including a display generating an image, an optical lens assembly including at least one negative lens, at least one positive lens, and a flat semi-transparent mirror that reflects image light of the display and transmits external real image light, which are arranged along an optical axis of the image, a housing in which the display and the optical lens assembly are mounted, and a coupling portion movably coupling the flat semi-transparent mirror to the housing.

The flat semi-transparent mirror may be disposed at a final position of an optical path of the image, one of the at least one positive lens may be disposed closest to the flat semi-transparent mirror, and each of the at least one negative lens and the at least one positive lens may be a rotationally symmetric lens with respect to the optical axis.

The electronic apparatus may further include a camera, and a processor configured to determine a position and attributes of an external object photographed by the camera, and check contents related to the attributes of the external object, wherein the contents are displayed on the display.

The electronic apparatus may further include a driving portion configured to automatically rotate the flat semi-transparent mirror.

The electronic apparatus may be mounted on a glasses frame.

Advantageous Effects of Disclosure

An optical lens assembly according to various embodiments may include lenses that are compact and easy to manufacture. An electronic apparatus according to various embodiments is worn on a user's head, and an image generated from a display and an actual image from the outside may be shown together.

MODE OF DISCLOSURE

Figure 1:
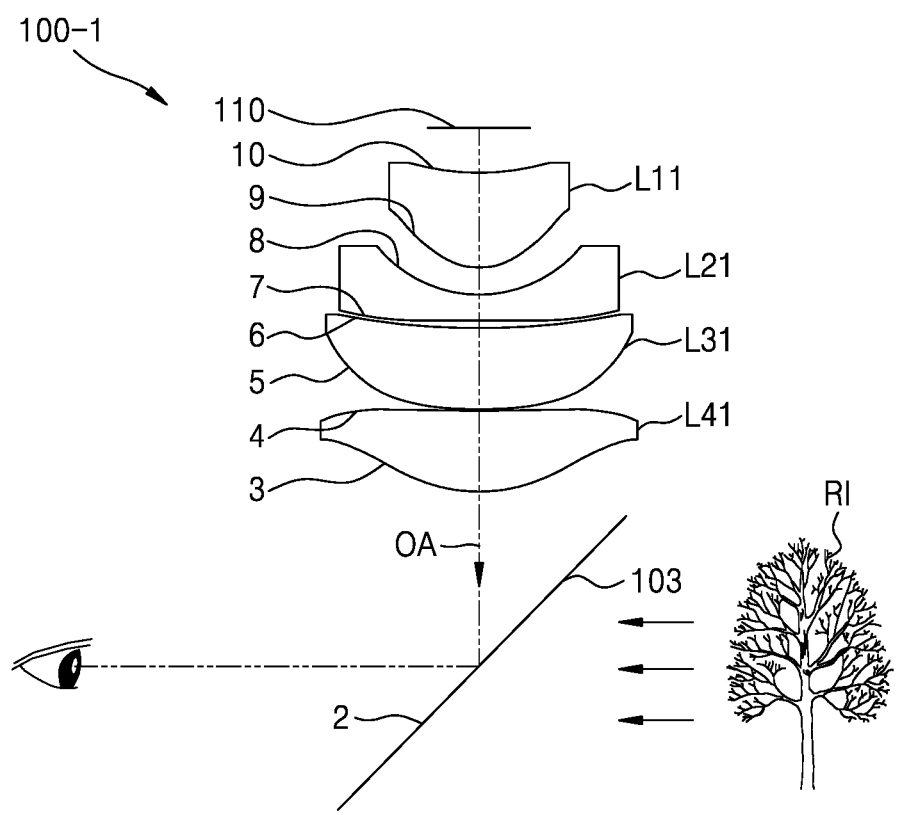
FIG. 1 illustrates an optical lens assembly according to an embodiment.

Various embodiments of the disclosure will now be described more fully with reference to the accompanying drawings. An electronic apparatus according to various embodiments of the disclosure may include various type of apparatuses. The electronic apparatus may include at least one of, for example, a portable communication device, e.g., a smartphone, a computer device, a portable multimedia device, a portable medical device, a camera, a wearable device, or a home appliance. An electronic apparatus according to an embodiment of the disclosure is not limited to the above-described apparatuses.

Various embodiments of the disclosure will be described with reference to the accompanying drawings. However, it should be understood that the disclosure is not limited to these particular embodiments but also includes various modifications, equivalents, and/or alternatives thereof. Throughout the specification and drawings, like reference numerals may be used to denote like elements or components. Singular forms may include plural forms as well, unless the context clearly indicates otherwise. In the specification, the expressions such as "A or B," "at least one of A and/or B," "A, B or C," or "at least one of A, B and/or C" may include all available combinations of items listed together. Terms such as "first" and "second" are used herein merely to describe a variety of constituent elements regardless of an order and/or importance and to distinguish one constituent element from another constituent element, but the constituent elements are not limited by the terms. It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components).

The term "module" used in various embodiments of the disclosure may denote a unit including one or two or more combinations of, for example, hardware, software, or firmware. The module may be interchangeably used with terms, for example, units, logics, logical blocks, components, or circuits. The module may be a minimum unit of a part that is integrally formed or a part thereof. The module may be a minimum unit performing one or more functions or a part thereof. For example, the module may include an application-specific integrated circuit (ASIC).

Various embodiments of the disclosure may be implemented by software, for example, a program 240, including instructions stored in a machine—(e.g., a computer-) readable storage media, e.g., an internal memory 236 or an external memory 238. The machine is capable of calling the instructions stored in a storage medium and operating according to the called instructions, and may include an electronic apparatus, e.g., an electronic apparatus 201, according to the disclosed embodiments. When the instructions are executed by a processor, e.g., a processor 220, the processor may perform functions corresponding to the instructions directly or by using other constituent elements under the control of the processor. The instructions may include codes generated or executed by a compiler or an interpreter. The machine-readable storage medium may be provided in the form of a non-transitory storage medium. The "non-transitory" may merely mean that a storage medium does not include a signal, but is tangible, and may not distinguish whether data is stored in the storage medium semi-permanently or temporarily.

According to an embodiment, the method according to various embodiments of the disclosure may be provided by being included in a computer program product. The computer program product may be traded, as a product, between sellers and buyers. The computer program product may be distributed in the form of a machine-readable storage medium, e.g., a compact disc read-only memory (CD-ROM), or online through an application store, e.g., Play- Store™. For an online distribution, at least part of a computer program product may be at least temporarily stored in a storage medium such as a manufacturer's server, an application store' server, or a relay server memory, or temporarily generated.

Each of constituent elements according to various embodiments, e.g., a module or a program, may include a single object or a plurality of objects, and some sub-constituent elements of the above-described sub-constituent elements may be omitted, or other sub-constituent elements may be further included in various embodiments. Alternatively or additionally, some constituent elements, e.g., a module or a program, are integrated into one object, a function performed by a corresponding constituent element before integration may be performed in an identical or similar manner. According to various embodiments, operations performed by a module, a program, or other constituent element may be sequentially, parallel, repetitively, or heuristically performed, and at least some operations may be performed in a different order, omitted, or other operations may be added.

Hereinafter, an optical assembly according to various embodiments, and an electronic apparatus having the same are described with reference to the accompanying drawings. In the specification, a term "user" may refer to a person using an electronic apparatus or an apparatus using an electronic apparatus, e.g., an artificial intelligence electronic apparatus.

FIG. 1 illustrates an optical lens assembly 100-1 according to an embodiment. The optical lens assembly 100-1 may be used in an electronic apparatus which is configured to be worn by a user to see an image generated from a display 110. The optical lens assembly 100-1 may include at least one lens and a flat semi-transparent mirror 103 that reflects some of incident light and transmits some of the incident light, along an optical path through which an image generated from the display 110 is transmitted. The flat semi-transparent mirror 103 may have a flat surface having no curvature. The flat semi-transparent mirror 103 may reflect image light generated from the display 110 and transmit external real image light.

The at least one lens may include at least one negative lens and at least one positive lens. One of the at least one positive lenses may be arranged closest to the flat semi-transparent mirror 103. For example, the optical lens assembly 100-1 of FIG. 1 may include a first positive lens L11, a second negative lens L21, a third positive lens L31, and a fourth positive lens L41, which are arranged toward the flat semi-transparent mirror 103 along an optical axis OA of an image generated from the display 110. The fourth positive lens L41 may be arranged closest to the flat semi-transparent mirror 103.

In the specification, an incident surface may means a surface on which light from the display 110 is incident, and an exit surface may mean a surface from which light exists. A positive lens may denote a lens having a positive refractive power, and a negative lens may denote a lens having a negative refractive power. The first positive lens L11 may include an exit surface 9 convex toward the flat semi-transparent mirror 103. The first positive lens L11 may have, for example, a meniscus shape convex toward the flat semi-transparent mirror 103. The second negative lens L21 may be, for example, a biconcave lens. The third lens L31 may include an exit surface 5 convex toward the flat semi-transparent mirror 103. For example, the third positive lens L31 may have a meniscus shape convex toward the flat semi-transparent mirror 103. The fourth positive lens L41 may has an exit surface 3 convex toward the flat semi-transparent mirror 103. For example, the fourth positive lens L41 may have a meniscus shape convex toward the flat semi-transparent mirror 103.

The flat semi-transparent mirror 103 may reflect some of incident light and transmit the other of the incident light. For example, the flat semi-transparent mirror 103 may have, for example, a reflectivity of 50%. However, the reflectivity of the flat semi-transparent mirror 103 is not limited thereto. Light of the image generated from the display 110 may pass through the lenses and may be reflected from the flat semi-transparent mirror 103 to thus enter a users eye. Light RI of an external real image may transmit through the flat semi-transparent mirror 103 to thus enter an eye in a see-through manner. Accordingly, the user may see a real image with the image generated from the display 110. Accordingly, augmented reality (AR) may be implemented. As an optical lens assembly may be worn like glasses such that an exit pupil (or a stop) of the optical lens assembly is arranged at a position of a person's pupil, a real-time image or information from the display may be transmitted to an eye.

Furthermore, as a mirror is configured to be flat without a refractive power, no distortion is generated in an external see-through image, and during manufacture, the optical axis OA and a reflective surface of the flat semi-transparent mirror 103 may be easily aligned with each other. Furthermore, when the optical lens assembly is mechanically arranged, a reflection angle of a mirror surface may be freely adjusted so that the direction of the optical lens assembly may be freely adjusted without limitations of up, down, left, and right direction. Furthermore, the optical lens assembly may be miniaturized by reducing the number of lens units, and thus, when the optical lens assembly is applied to a headset, a user may wear the headset lightly.

Each of the lenses included in the optical lens assembly 100-1 may be all rotationally symmetric lenses with respect to the optical axis OA. In other words, the first positive lens L11, the second negative lens L21, the third positive lens L31, and the fourth positive lens L41 each may be rotationally symmetric lenses with respect to the optical axis OA. Accordingly, manufacture of a lens may be easy and manufacturing costs may be low. The optical lens assembly 100-1 may include at least one aspherical lens. For example, each of the first positive lens L11, the second negative lens L21, the third positive lens L31, and the fourth positive lens L41 may be a bi-aspherical lens.

An aspherical surface used in an optical lens assembly according to various embodiments is defined as follows.

An aspherical shape may be expressed by the following equation assuming that an optical axis direction is an x-axis, a direction perpendicular to the optical axis direction is a y-axis, and a light ray proceeding direction is positive. In the equation, x denotes a distance in an optical axis direction from an apex of a lens, y denotes a distance in a direction perpendicular to the optical axis, K denotes a conic constant, A, B, C, and D denote aspherical coefficients, and c denotes a reciprocal (1/R) of a radius of curvature at the apex of a lens.

$$x = \frac{cy^2}{1+\sqrt{1-(K+1)c^2y^2}} + Ay^4 + By^6 + Cy^8 + Dy^{10} + \ldots \quad \text{<Equation 1>}$$

The flat semi-transparent mirror 103 may change a path of light to allow an image to enter a users eye. As a flat semi-transparent mirror is configured to be flat, manufacture thereof may be easy and generation of aberration may be reduced. Furthermore, even when the position of a flat semi-transparent mirror is changed, there is no distortion of light so that the flat semi-transparent mirror may be freely moved.

Figure 3:
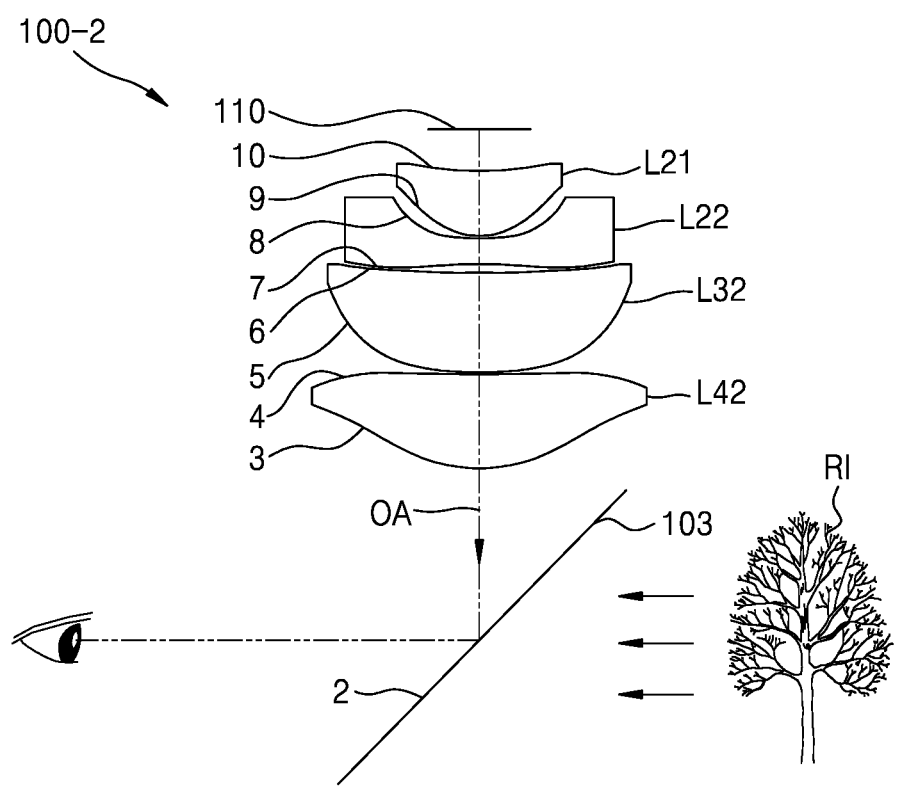
FIG. 3 illustrates an optical lens assembly according to another embodiment.

FIG. 3 illustrates an optical lens assembly 100-2 according to another embodiment. The optical lens assembly 100-2 may include a first positive lens L12, a second negative lens L22, a third positive lens L32, a fourth positive lens L42, and the flat semi-transparent mirror 103, which are arranged along the optical axis OA of an image generated from the display 110. The fourth positive lens L42 may be arranged closest to the flat semi-transparent mirror 103. As the shapes and configuration of the first positive lens L12, the second negative lens L22, the third positive lens L32, and the fourth positive lens L42 are the same as those of lenses included in the optical lens assembly 100-1 of FIG. 1, detailed descriptions thereof are omitted.

Figure 5:
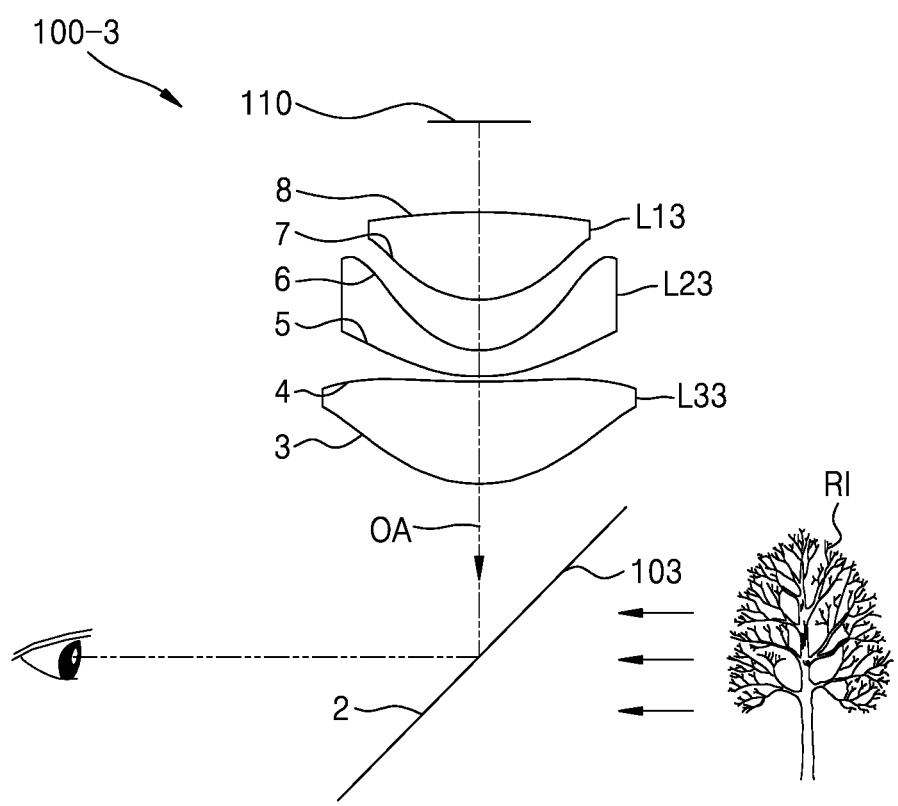
FIG. 5 illustrates an optical lens assembly according to another embodiment.

FIG. 5 illustrates an optical lens assembly 100-3 according to another embodiment. The optical lens assembly 100-3 may include a first positive lens L13, a second negative lens L23, a third positive lens L33, and the flat semi-transparent mirror 103 which are arranged along an optical axis of the image generated from the display 110. The first positive lens L13 may have an exit surface 7 convex toward the flat semi-transparent mirror 103. For example, a second positive lens L13 may be a biconvex lens. The second negative lens L23 may have the exit surface 5 convex toward the flat semi-transparent mirror 103. The second negative lens L23 may have, for example, a meniscus shape. The third positive lens L33 may have the exit surface 3 convex toward the flat semi-transparent mirror 103. For example, the third positive lens L33 may have a meniscus shape.

An optical assembly according to various embodiments may satisfy the following inequality.

$$1 \leq \left|\frac{T_{(S2-Si)}}{f}\right| \leq 4 \qquad \text{<Inequality 2>}$$

In the inequality, $T_{(S2-Si)}$ denotes a distance from the display 110 to the flat semi-transparent mirror 103, and f denotes a focal length of the optical lens assembly.

When $$\left|\frac{T_{(S2-Si)}}{f}\right|$$

is less than a lower limit in Inequality 2, a distance from the display 110 to the flat semi-transparent mirror 103 is too short compared with the focal length, and thus, although a compact product configuration is possible, an effective aberration correction is difficult so that it is difficult to secure performance of an image transmitted to the eye. When $$\left|\frac{T_{(S2-Si)}}{f}\right|$$

exceeds an upper limit, it is advantageous for an effective aberration correction, but a product size increases so that miniaturization is difficult.

An optical assembly according to various embodiments may satisfy the following inequality.

$$25 \leq V1-V2 \leq 40 \qquad \text{<Inequality 3>}$$

In the inequality, V1 denotes an Abbe number of a negative lens arranged closest to the flat semi-transparent mirror, and V2 denotes an Abbe number of a positive lens arranged closest to the flat semi-transparent mirror.

For example, the optical lens assembly 100-1 of FIG. 1 may include the first positive lens L11, the second negative lens L21, the third positive lens L31, and the fourth positive lens L41, and may be configured such that an Abbe number difference between the second negative lens L21 and the fourth positive lens L41 satisfies Inequality 3. The same is applied to the optical lens assembly 100-2 of FIG. 3. The optical lens assembly 100-3 of FIG. 5 may include the first positive lens L13, the second negative lens L23, and the third positive lens L33, and may be configured such that an Abbe number difference between the second negative lens L23 and the third lens L33 satisfies Inequality 3.

When (V1−V2) exceeds the upper limit of Inequality 2, an Abbe number difference increases to be advantageous for a chromatic aberration correction, but material costs may be increased. When (V1−V2) exceeds the lower limit, an effective chromatic aberration correction may be difficult.

As all lenses included in an optical lens assembly according to various embodiments are configured to be aspherical, the optical lens assembly may be made compact and optical aberrations such as spherical aberration, distortion, astigmatic aberration, and the like may be effectively corrected. Furthermore, as all lenses are configured to be plastic lenses, the electronic apparatus may be lightly worn on the head of a person. The lenses included in an optical lens assembly according to various embodiments each may be rotationally symmetric aspherical lenses with respect to an optical axis, and thus it is possible to minimize performance degradation and assembly error sensitivity due to assembly errors during manufacturing. Accordingly, a configuration of a compact and high performance cheap optical system for AR glasses may be possible.

An embodiment according to various designs is described below.

In each embodiment, surface numbers 1, 2, 3 . . . , n, where n is a natural number, are sequentially linearly arranged from a surface close to a user's eye to a surface close to a display module. F denotes a focal length of an optical lens assembly (the unit is mm), FNO denotes an F number, 2w denotes a viewing angle (the unit is a degree), ImgH denotes an image height (the unit is mm), R denotes a radius of curvature (the unit is mm), DN denotes the thickness of a lens (or a mirror) or an air gap (the unit is mm) between a lens (or a mirror) and a lens (or a mirror), Nd denotes a refractive index, and Vd denotes an Abbe number. ST denotes a stop, OBJ denotes an object, and ASP denotes an aspherical surface. In each embodiment, a stop ST may be selectively provided. When there is no stop ST, a users eye may located at the position of a stop.

Embodiment 1

FIG. 1 illustrates the optical lens assembly 100-1 according to various embodiment, that is, according to a first embodiment, and Table 1 shows, for example, design data according to the first embodiment.

f; −13.046 FNO; 1.63 2ω; 26.0 ImgH; 3.0

TABLE 1

| Surface | R | DN | Nd | Vd |
|---|---|---|---|---|
| OBJ: | INFINITY | INFINITY | | |
| ST: | INFINITY | 25.000000 | | |
| 2: | INFINITY | −10.000000 | Flat semi- | |

TABLE 1-continued

| Surface | R | DN | Nd | Vd |
|---|---|---|---|---|
|  |  |  | transparent mirror |  |
| 3: | −8.72582 | −4.697262 | 1.524698 | 56.2379 |
| ASP: |  |  |  |  |
| K: −1.218431 |  |  |  |  |
| A: 0.153940E−04 B: 0.164574E−05 C: 0.279429E−07 D: −0.282644E−09 |  |  |  |  |
| E: 0.504440E−12 |  |  |  |  |
| 4: | −69.21295 | −0.100000 |  |  |
| ASP: |  |  |  |  |
| K: 15.176960 |  |  |  |  |
| A: 0.113680E−03 B: 0.562699E−06 C: 0.264909E−08 D: −0.974967E−12 |  |  |  |  |
| E: −0.197820E−12 |  |  |  |  |
| 5: | −25.80378 | −4.679823 | 1.524698 | 56.2379 |
| ASP: |  |  |  |  |
| K: 6.127721 |  |  |  |  |
| A: −0.255425E−03 B: −0.421169E−06 C: −0.546651E−08 D: −0.222066E−10 |  |  |  |  |
| E: 0.647078E−13 |  |  |  |  |
| 6: | −21.49777 | −0.475509 |  |  |
| ASP: |  |  |  |  |
| K: −50.708933 |  |  |  |  |
| A: 0.182285E−04 B: 0.115744E−06 C: −0.308242E−11 D: −0.280743E−10 |  |  |  |  |
| E: −0.528802E−12 |  |  |  |  |
| 7: | 356.66068 | −1.500000 | 1.650994 | 21.4851 |
| ASP: |  |  |  |  |
| K: 69.553522 |  |  |  |  |
| A: −0.213478E−03 B: 0.170366E−05 C: −0.185521E−07 D: 0.260820E−09 |  |  |  |  |
| E: −0.243788E−11 |  |  |  |  |
| 8: | −8.01469 | −1.572245 |  |  |
| ASP: |  |  |  |  |
| K: −0.202298 |  |  |  |  |
| A: −0.197603E−05 B: 0.503439E−06 C: −0.245098E−06 D: −0.775792E−09 |  |  |  |  |
| E: 0.936973E−10 |  |  |  |  |
| 9: | −3.75798 | −5.500000 | 1.524698 | 56.2379 |
| ASP: |  |  |  |  |
| K: −0.998952 |  |  |  |  |
| A: 0.247557E−03 B: −0.166757E−04 C: 0.539411E−06 D: −0.299632E−07 |  |  |  |  |
| E: 0.134637E−08 |  |  |  |  |
| 10: | −18.76146 | −2.606283 |  |  |
| ASP: |  |  |  |  |
| K: −42.537580 |  |  |  |  |
| A: −0.346963E−02 B: 0.189655E−03 C: 0.639641E−06 D: −0.150906E−06 |  |  |  |  |
| IMG: |  | INFINITY |  |  |

Figure 2:
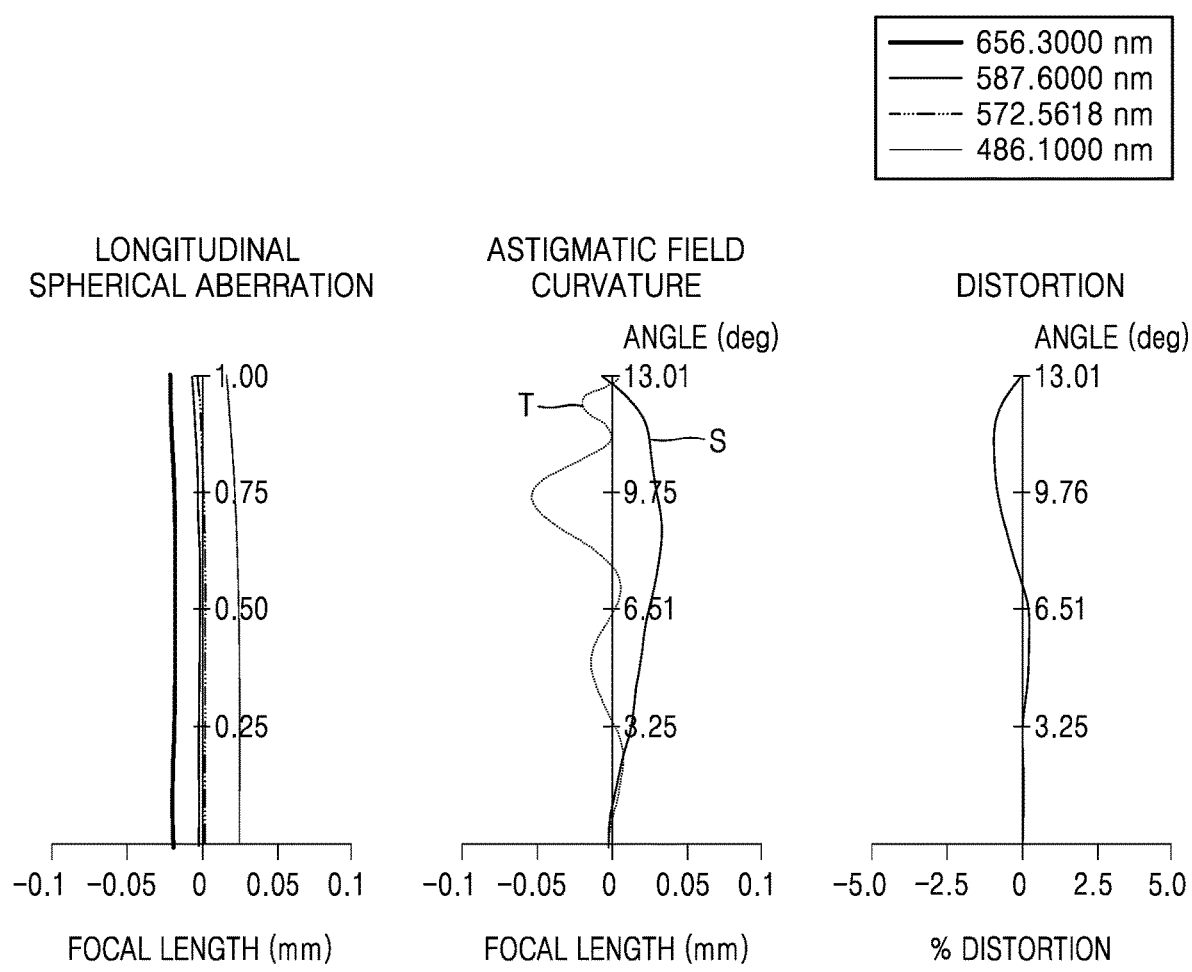
FIG. 2 is an aberration diagram of an optical lens assembly according to an embodiment.

FIG. 2 shows longitudinal spherical aberration, astigmatic field curves, and distortion of the optical lens assembly 100-1 according to a first embodiment. Longitudinal spherical aberration is shown with respect to, for example, light having a wavelength of 656.3000 nanometers (NM), 587.6000 NM, 572.5618 NM, and 486.1000 NM, and astigmatic field curves may include a tangential field curvature T and a sagittal field curvature S. The astigmatic field curves are shown with respect to light having a wavelength of 587.6000 NM, and distortion is shown with respect to light having a wavelength of 587.6000 NM.

Embodiment 2

FIG. 3 illustrates the optical lens assembly 100-2 according to various embodiment, that is, a second embodiment, and Table 2 shows, for example, design data according to the second embodiment.

f; −12.080 FNO; 1.51 2ω; 28.0 ImgH; 3.0

TABLE 2

| Surface | R | DN | Nd | Vd |
|---|---|---|---|---|
| OBJ: | INFINITY | INFINITY |  |  |
| ST: | INFINITY | 25.000000 |  |  |
| 2: | INFINITY | −10.000000 | Flat semi-transparent mirror |  |
| 3: | −8.65102 | −5.447127 | 1.524698 | 56.2379 |
| ASP: |  |  |  |  |
| K: −1.188319 |  |  |  |  |
| A: 0.300680E−05 B: 0.137267E−05 C: 0.267470E−07 D: −0.284670E−09 |  |  |  |  |
| E: 0.445131E−12 |  |  |  |  |
| 4: | −63.97487 | −0.100000 |  |  |
| ASP: |  |  |  |  |
| K: 33.482708 |  |  |  |  |

TABLE 2-continued

| Surface | R | DN | Nd | Vd |
|---|---|---|---|---|
| A: 0.159527E-03 B: 0.570815E-06 C: 0.156093E-08 D: -0.102392E-10 E: -0.228519E-12 | | | | |
| 5: ASP: | -23.68600 | -5.808388 | 1.524698 | 56.2379 |
| K: 5.785461 | | | | |
| A: -0.300526E-03 B: -0.119800E-05 C: -0.799847E-09 D: 0.192560E-09 E: -0.315465E-11 | | | | |
| 6: ASP: | -90.24826 | -0.454844 | | |
| K: 96.041669 | | | | |
| A: 0.274177E-04 B: 0.141247E-07 C: -0.833401E-09 D: -0.113402E-10 E: -0.433304E-12 | | | | |
| 7: ASP: | 25.33718 | -1.500000 | 1.650994 | 21.4851 |
| K: -99.000000 | | | | |
| A: -0.285168E-03 B: 0.197206E-05 C: -0.161453E-07 D: 0.253650E-09 E: -0.342411E-11 | | | | |
| 8: ASP: | -16.19866 | -0.182624 | | |
| K: 3.356608 | | | | |
| A: -0.253684E-02 B: 0.322738E-04 C: 0.174740E-06 D: -0.618815E-07 E: -0.154000E-08 F: 0.724969E-10 | | | | |
| 9: ASP: | -4.55112 | -3.753666 | 1.524698 | 56.2379 |
| K: -0.650008 | | | | |
| A: -0.123661E-02 B: 0.186003E-04 C: 0.127006E-05 D: -0.286399E-07 E: 0.798197E-09 F: 0.459391E-10 | | | | |
| 10: ASP: | -23.40684 | -2.430993 | | |
| K: -99.000000 | | | | |
| A: -0.268971E-02 B: 0.154269E-03 C: -0.295111E-06 D: -0.445519E-07 E: 0.139055E-08 F: -0.214550E-09 | | | | |
| IMG: | INFINITY | 0.013304 | | |

Figure 4:
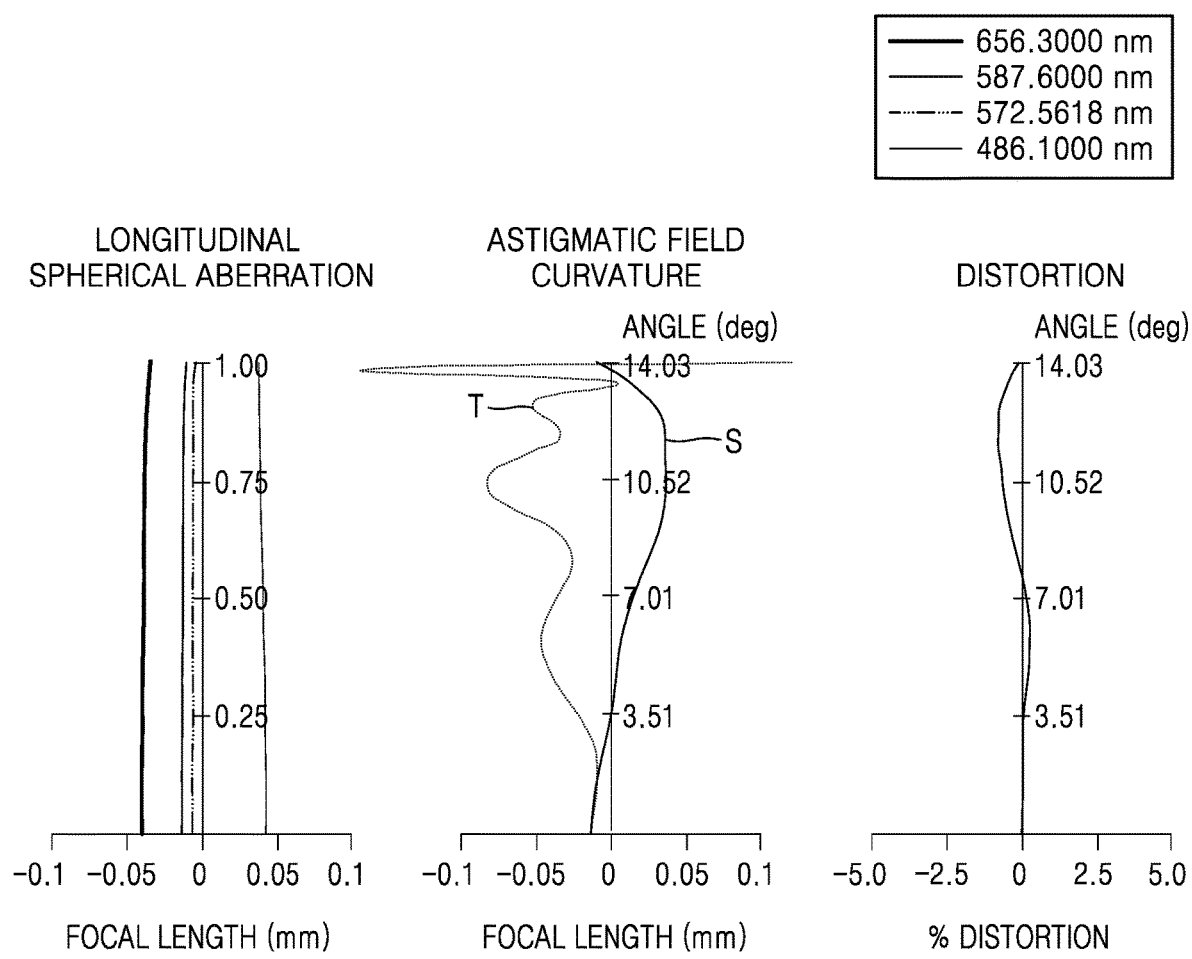
FIG. 4 is an aberration diagram of an optical lens assembly according to another embodiment.

FIG. 4 illustrates longitudinal spherical aberration, astigmatic field curves, and distortion of the optical lens assembly 100-2 according to the second embodiment.

Third Embodiment

FIG. 5 illustrates the optical lens assembly 100-3 according to various embodiment, that is, a third embodiment, and Table 3 shows, for example, design data according to the third embodiment.

f; -13.60 FNO; 1.7 2ω; 25.56 ImgH; 3.0

TABLE 3

| Surface | R | Dn | Nd | Vd |
|---|---|---|---|---|
| OBJ: | INFINITY | INFINITY | | |
| ST: | INFINITY | 25.000000 | | |
| 2: | INFINITY | -10.000000 | Flat semi-transparent mirror | |
| 3: ASP: | -8.03478 | -5.912489 | 1.524698 | 56.2379 |
| K: -0.995170 | | | | |
| A: -0.463430E-05 B: 0.460353E-06 C: 0.225110E-07 D: -0.250056E-09 E: 0.126637E-11 | | | | |
| 4: ASP: | -46.93545 | -0.310313 | | |
| K: 17.238945 | | | | |
| A: 0.208697E-03 B: 0.359715E-06 C: -0.338979E-08 D: -0.171961E-10 E: 0.394582E-12 | | | | |
| 5: ASP: | -10.15563 | -1.500000 | 1.650994 | 21.4851 |
| K: -2.992348 | | | | |
| A: -0.177565E-03 B: 0.273344E-05 C: -0.539436E-08 D: 0.315306E-09 E: -0.437568E-11 | | | | |
| 6: ASP: | -4.42509 | -2.957083 | | |
| K: -0.732181 | | | | |

TABLE 3-continued

| Surface | R | Dn | Nd | Vd |
|---|---|---|---|---|
| A: −0.133615E−03 B: 0.838349E−05 C: 0.110470E−06 D: 0.217006E−08 E: −0.699370E−11 | | | | |
| 7: | −5.99155 | −5.073545 | 1.524698 | 56.2379 |
| ASP: K: −0.833288 A: −0.372315E−03 B: 0.116232E−04 C: −0.200846E−06 D: 0.197465E−09 E: 0.101118E−09 | | | | |
| 8: | 22.30467 | −5.243654 | | |
| ASP: K: −99.000000 A: −0.146098E−03 B: −0.117496E−05 C: 0.132863E−06 D: 0.276361E−08 E: −.598163E−10 | | | | |
| IMG: | INFINITY | | | |

Figure 6:
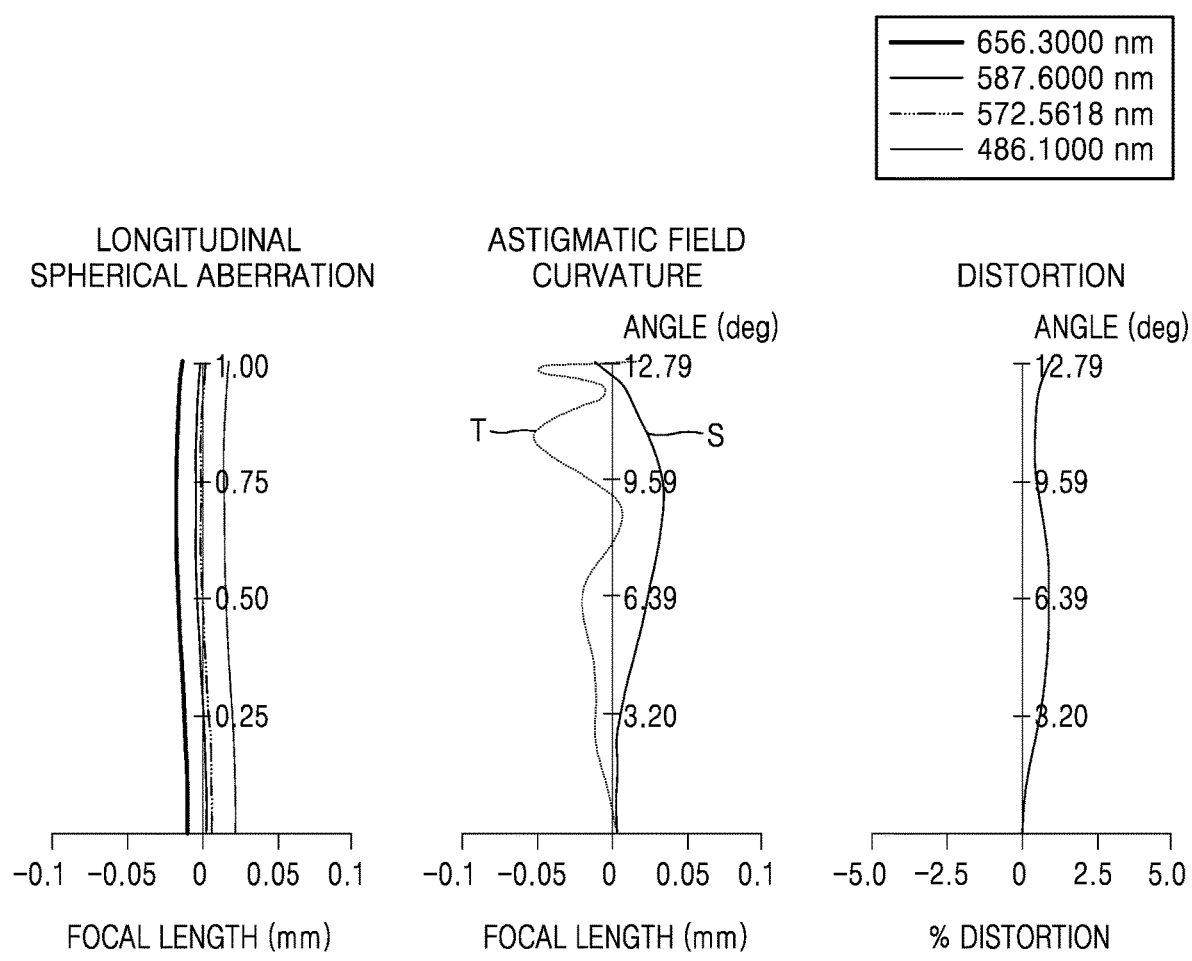
FIG. 6 illustrates an aberration diagram of an optical lens assembly according to another embodiment.

FIG. 6 illustrates longitudinal spherical aberration, astigmatic field curves, and distortion of the optical lens assembly 100-3 according to the third embodiment.

Values with respect to the condition ranges according to the above embodiments are shown below.

TABLE 4

| | First embodiment | Second embodiment | Third embodiment |
|---|---|---|---|
| Equation 1 | 2.386 | 2.456 | 2.2794 |
| Inequality 2 | 34.753 | 34.753 | 34.753 |

Figure 7:
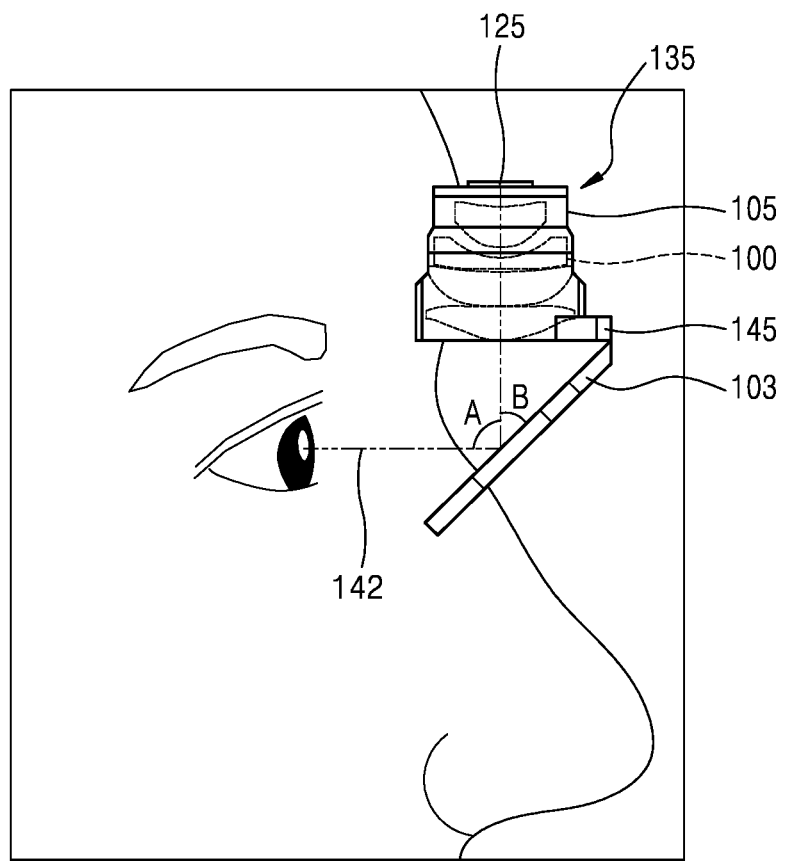
FIG. 7 illustrates an example in which an electronic apparatus according to an embodiment is worn on a user's head.

An optical lens assembly according to various embodiments may include a flat semi-transparent mirror, at least one positive lens, and at least one negative lens, and as the optical lens assembly is employed in an electronic apparatus, various pieces of information may be shown. FIG. 7 illustrates an example in which an optical lens assembly 100 is worn on a user's head. The optical lens assembly 100 may be worn such that a user's pupil is located at a position of a stop of the optical lens assembly 100. The embodiments described with reference to FIGS. 1 to 6 may be employed as the optical lens assembly 100, and the optical lens assembly 100 may be included in a housing 105. An electronic apparatus 135 according to various embodiments may include the housing 105, the optical lens assembly 100 mounted in the housing 105, and a display module 125 for forming an image. The housing 105 may be, for example, a barrel, but the disclosure is not limited thereto. The flat semi-transparent mirror 103 of the optical lens assembly 100 may be disposed outside the housing 105. The flat semi-transparent mirror 103 may be coupled to the housing 105 via a coupling portion 145. According to various embodiments, when a user wears the electronic apparatus 135, the optical lens assembly 100 may be configured such that an entrance pupil (or a stop) of the optical lens assembly 100 is located at a position of a user's pupil. Furthermore, the flat semi-transparent mirror 103 may be coupled to the electronic apparatus 135 to form a designated angle with the optical axis OA of the optical lens assembly 100. The position of the flat semi-transparent mirror 103 may be adjusted so that the optical axis OA is located at a designated position, for example, a measured position where the user's pupil is to be located. For example, the position of the flat semi-transparent mirror 103 may be adjusted such that a sum of an angle A between a center axis 142 of the user's pupil and the optical axis OA of the optical lens assembly 100 and an angle B between the optical axis OA and the flat semi-transparent mirror 103 has a value greater than about 90° and less than 180°.

Figure 8:
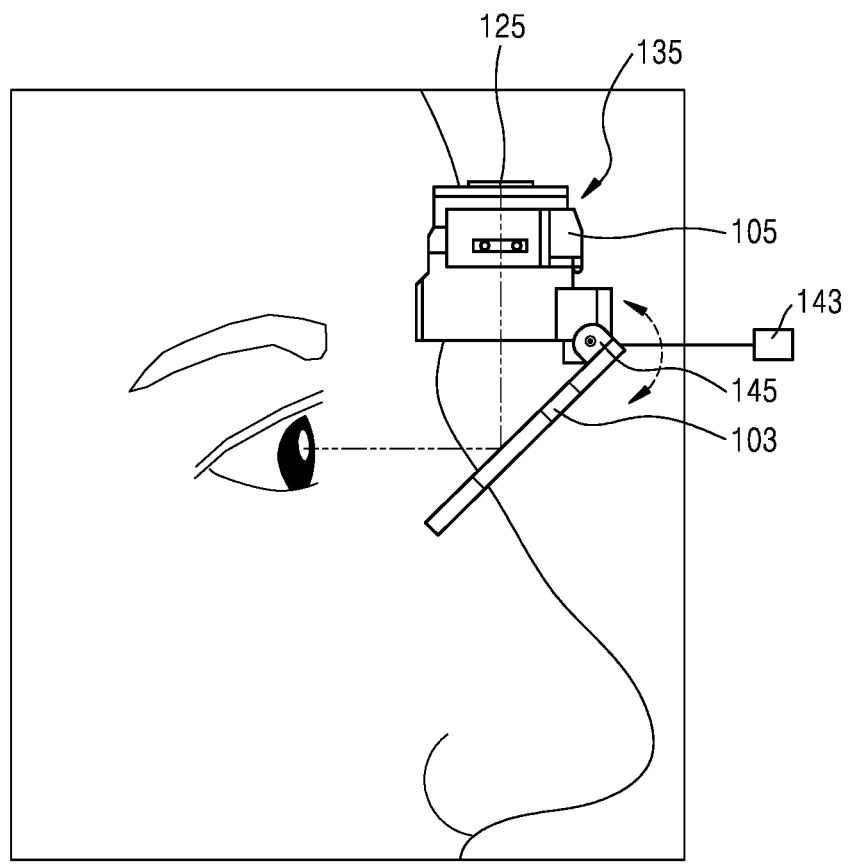
FIG. 8 illustrates rotation of a reflective mirror of an electronic apparatus according to an embodiment.

FIG. 8 illustrates a structure in which the flat semi-transparent mirror 103 is hinge-coupled to the housing 105. The flat semi-transparent mirror 103 may be rotated by the hinge coupling portion 145. The flat semi-transparent mirror 103 transmits an image having passed through the lenses of the optical lens assembly 100, without refraction or distortion, to the user's eye, and thus even when the flat semi-transparent mirror 103 is rotated, the image is not affected. Accordingly, the flat semi-transparent mirror 103 may be freely rotated. Although the flat semi-transparent mirror 103 may be manually rotated, a driving portion 143 for automatically rotating the flat semi-transparent mirror 103 may be further provided. A reflection angle of the flat semi-transparent mirror 103 may be changed by adjusting the position of the flat semi-transparent mirror 103 according to the position of the optical lens assembly 100 with respect to the user's pupil.

Figure 9:
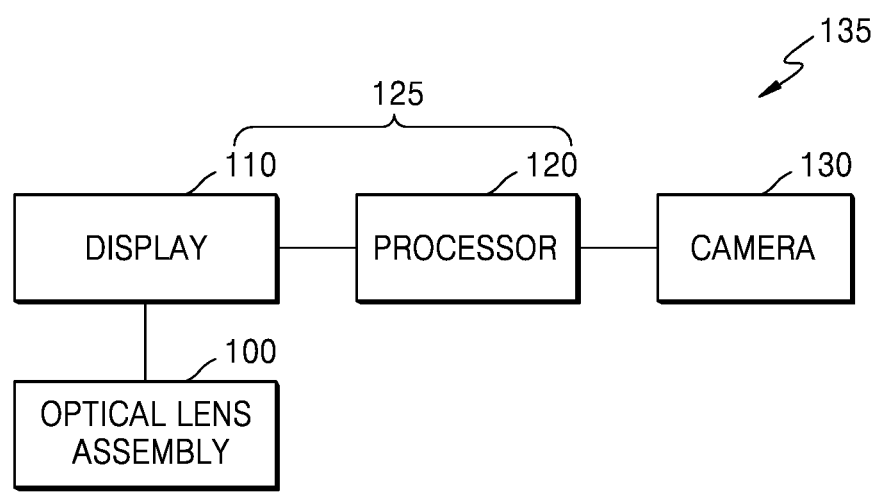
FIG. 9 is a block diagram of an electronic apparatus according to an embodiment.

FIG. 9 is a block diagram of the electronic apparatus 135 according to various embodiments. The electronic apparatus may include the optical lens assembly 100, the display 110 for displaying an image, and a processor 120. The display 110 and the processor 120 may form the display module 125. The electronic apparatus 135 may further include a camera 130. An image photographed by the camera 130 may be transmitted to the processor 120, information about the image may be processed by the processor 120, and the information may be displayed on the display 110.

Figure 10:
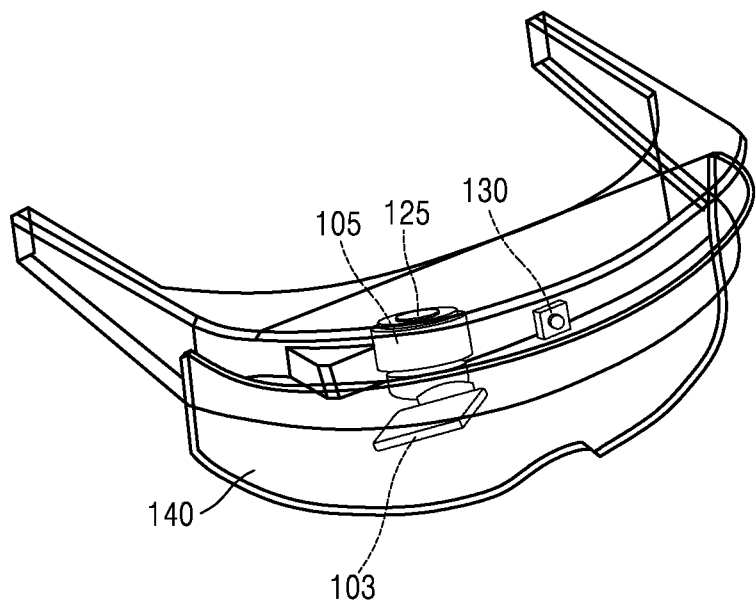
FIG. 10 illustrates an example in which an electronic apparatus according to various embodiments is employed in one eye of glasses.

Referring to FIG. 10, an optical lens assembly according to various embodiments may be mounted on a frame 140 such as a goggle or glasses. The optical lens assembly, as described above, may be mounted on the housing 105, and the housing 105 may be coupled to the frame 140. The housing 105 may include the display module 125. For convenience of explanation, the optical lens assembly included in the housing 105 is not illustrated below. When a user wears the frame 140, the user may see from the display module real-time information, for example, news, emails, text, heart bits, and the like, and also an external real-time image in a see-through manner through the flat semi-transparent mirror 103.

Furthermore, the camera 130 may be mounted on the frame 140. The camera 130 may be connected to the display module 125. An external object or scene is photographed by the camera 130, and information about the photographed image may be displayed real time through the display module 125. Accordingly, AR technology, in which an external object may be seen through the flat semi-transparent mirror 103 by the user's eye, and a virtual image processed in the display module 125 is seen by being overlapped with the external object image, may be implemented. The electronic apparatus 135 according to various embodiments may be applied to head mounted displays such as AR glasses, sports goggles, and the like.

The head mounted display may be in the form of a helmet, a visor, glasses, and a goggle, or may be attached by one or more straps. The head mounted display may be used for aeronautics, engineering, science, medicine, computer games, videos, sports, training, simulations, and various applications.

The electronic apparatus according to various embodiments may be applied to mobile devices, virtual reality devices, augmented reality devices, surround view input devices for vehicles, unmanned mobile device vision systems, imaging devices for driving of a vehicle, and the like mobile.

Figure 11:
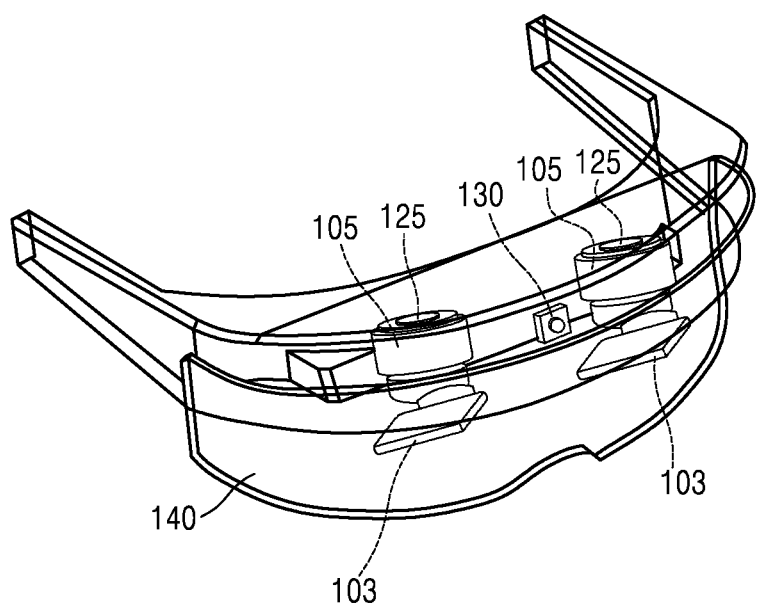
FIG. 11 illustrates an example in which an electronic apparatus according to various embodiments is employed in both eyes of glasses.

FIG. 11 illustrates an example in which an optical lens assembly corresponding to user's both eyes is mounted in a head mounted display. An image photographed by the camera 130 may be processed by each of the display modules 125 corresponding to both eyes.

Figure 12:
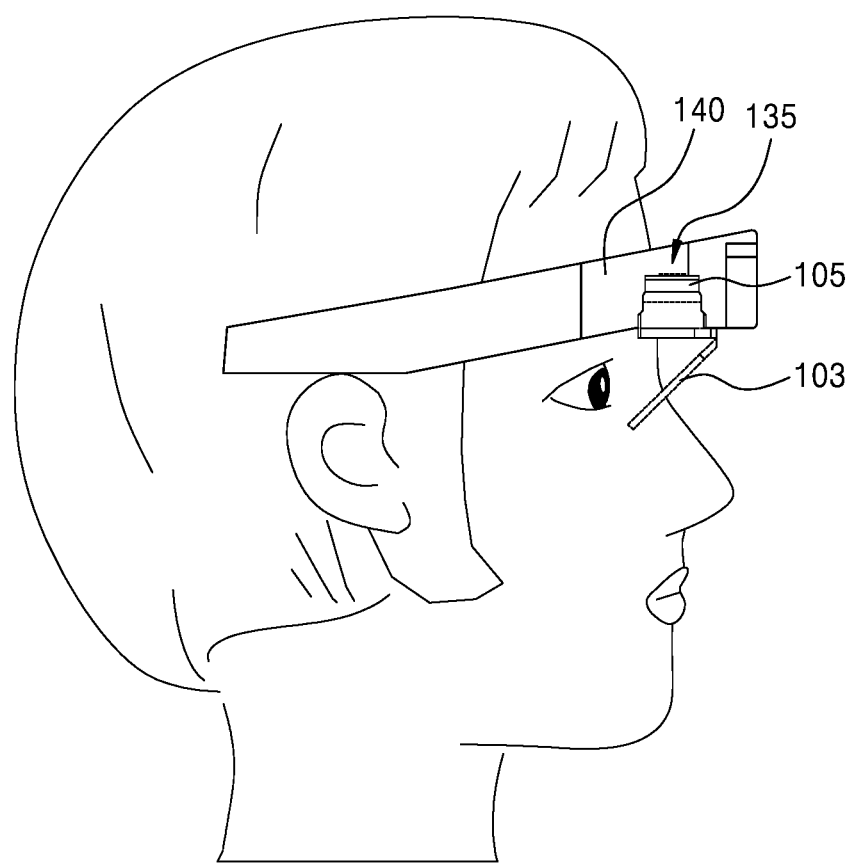
FIG. 12 illustrates an example in which a user wears a glasses-type electronic apparatus according to various embodiments.
Figure 13:
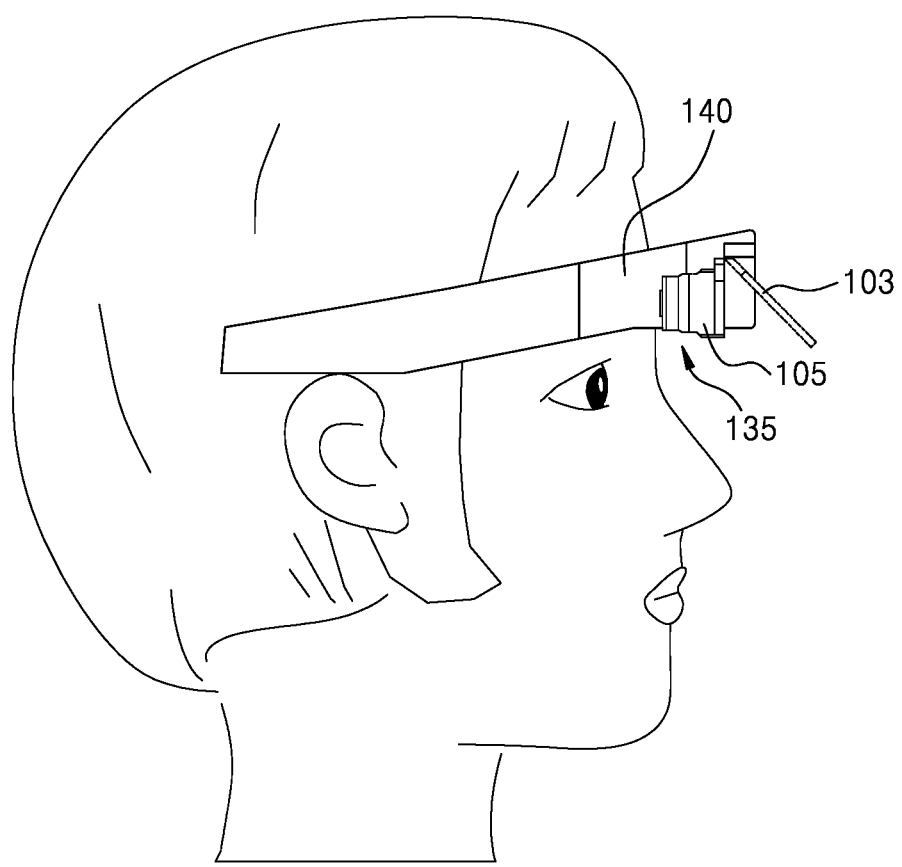
FIG. 13 illustrates an example in which a user wears a glasses-type electronic apparatus according to various embodiments and the glasses-type electronic apparatus is moved.
Figure 14:
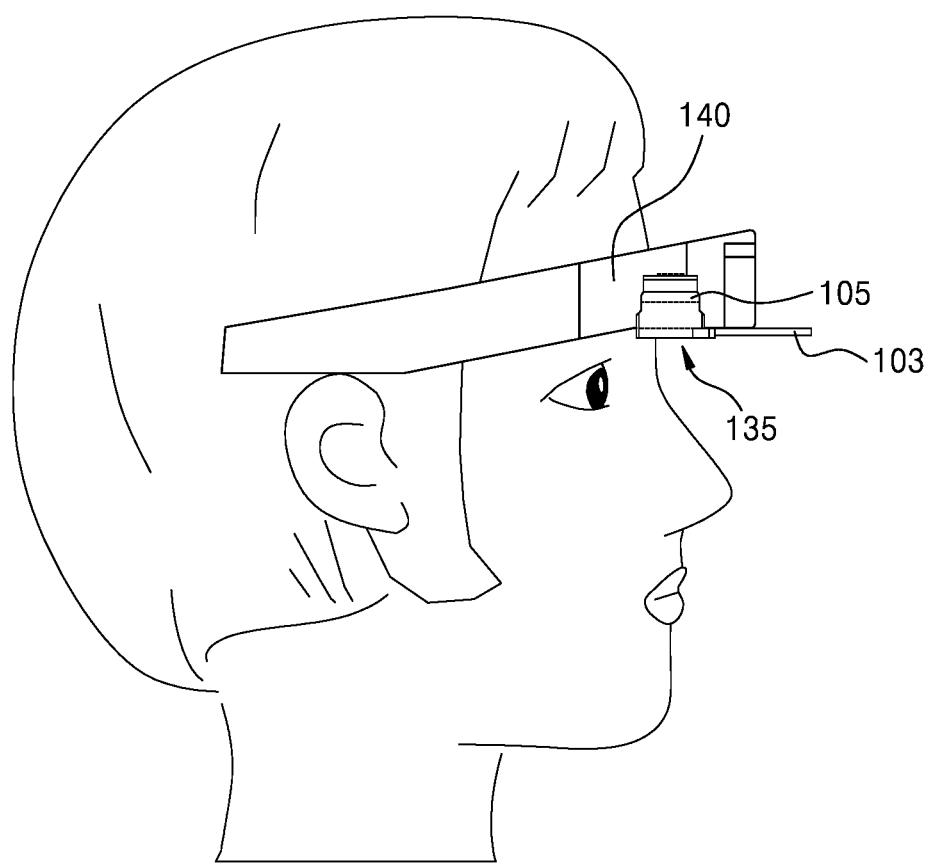
FIG. 14 illustrates an example in which a user wears a glasses-type electronic apparatus according to various embodiments and a flat semi-transparent mirror of the electronic apparatus is moved.

FIG. 12 illustrates a state in which a user wearing a head mounted display may see an AR image. FIG. 13 illustrates a state in which an image from the display module is not transmitted to the user's eye by rotating the electronic apparatus 135 mounted on the frame 140. This shows a situation in which a user sees an external scene only with the naked eye. In this state, as the housing 105 and the flat semi-transparent mirror 103 move together, the flat semi-transparent mirror 103 may be removed in front of the user's eye. FIG. 14 illustrates that, while the housing 105 is not moved, the flat semi-transparent mirror 103 only is moved. By freely moving the flat semi-transparent mirror 103, it may be easily selected to see an AR image or a real image only.

Figure 15:
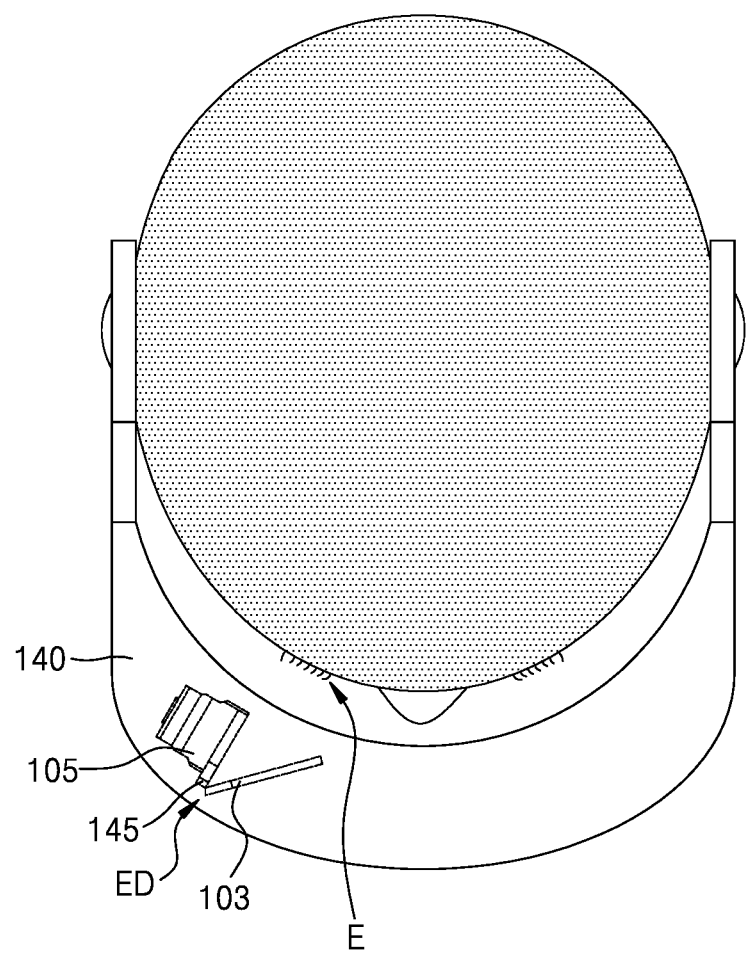
FIG. 15 illustrates an example in which an electronic apparatus according to various embodiments is disposed at a side portion of one eye of a user.
Figure 16:
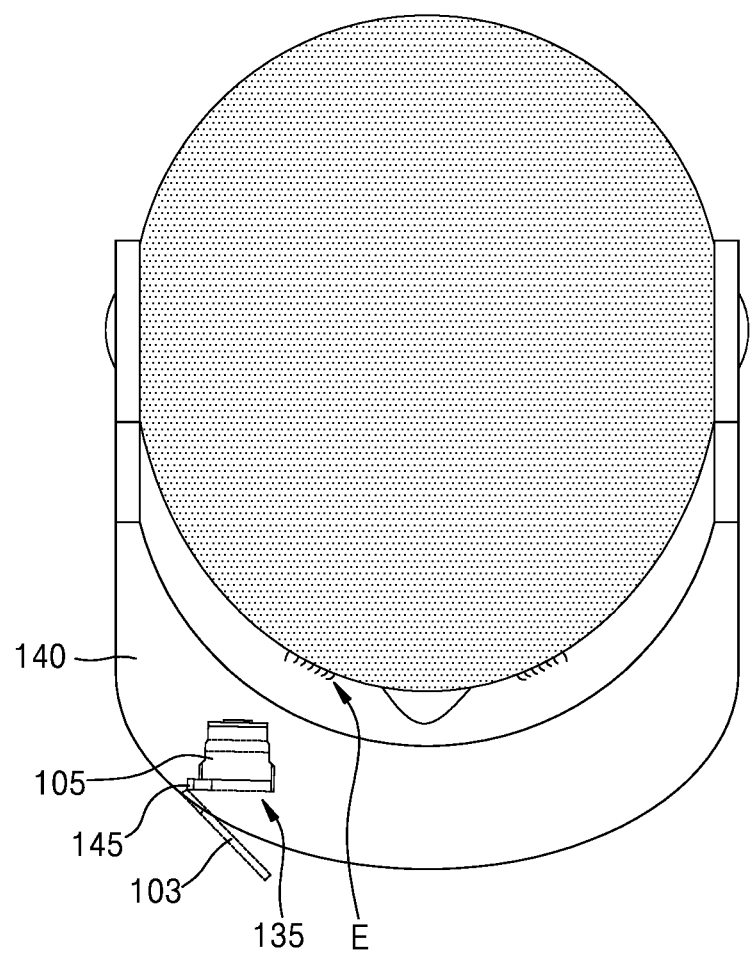
FIG. 16 illustrates a state in which an electronic apparatus is deviated from a user's eye by moving the electronic apparatus of FIG. 15.

FIG. 15 illustrates an example in which the position of the electronic apparatus 135 including the housing 105 and the flat semi-transparent mirror 103 is changed in the frame 140. The housing 105 is arranged at a side portion with respect to the user's eye. The flat semi-transparent mirror 103 may be arranged in front of the user's eye so that an image may be transmitted to the user's eye. As illustrated in FIG. 16, by moving the housing 105 and the flat semi-transparent mirror 103 of FIG. 15, the flat semi-transparent mirror 103 may be removed from a user's eye E.

Figure 17:
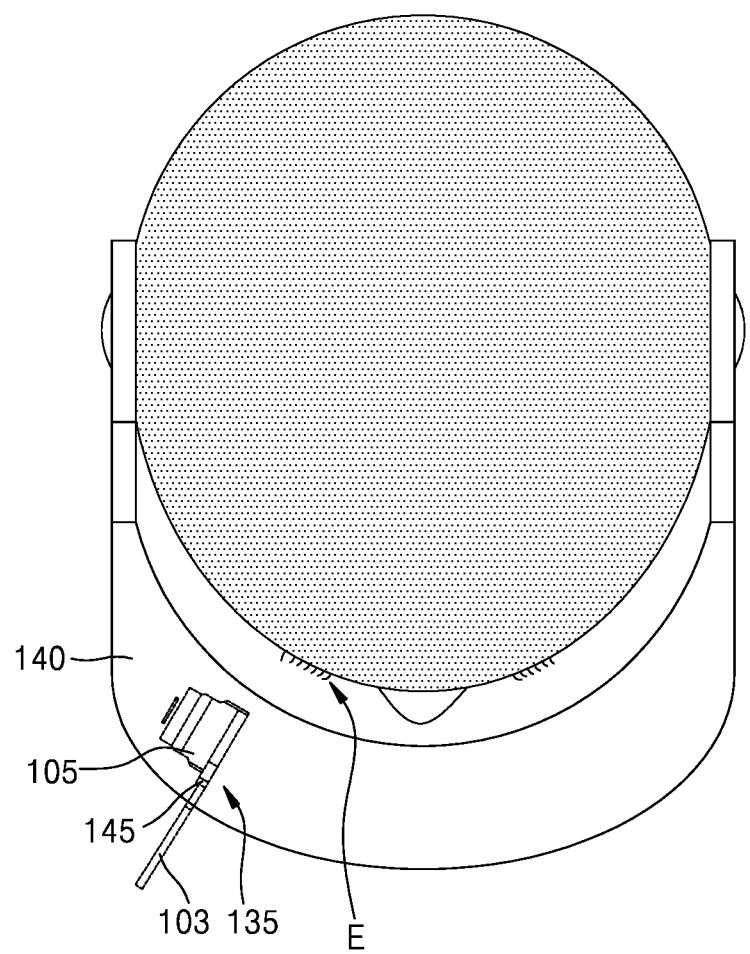
FIG. 17 illustrates a state in which by using a flat semi-transparent mirror is deviated from a user's eye by moving the flat semi-transparent mirror of the electronic apparatus of FIG. 15.

Alternatively, as illustrated in FIG. 17, while the housing 105 is fixed, only the flat semi-transparent mirror 103 is moved so that the flat semi-transparent mirror 103 may be removed from the user's eye E.

Figure 18:
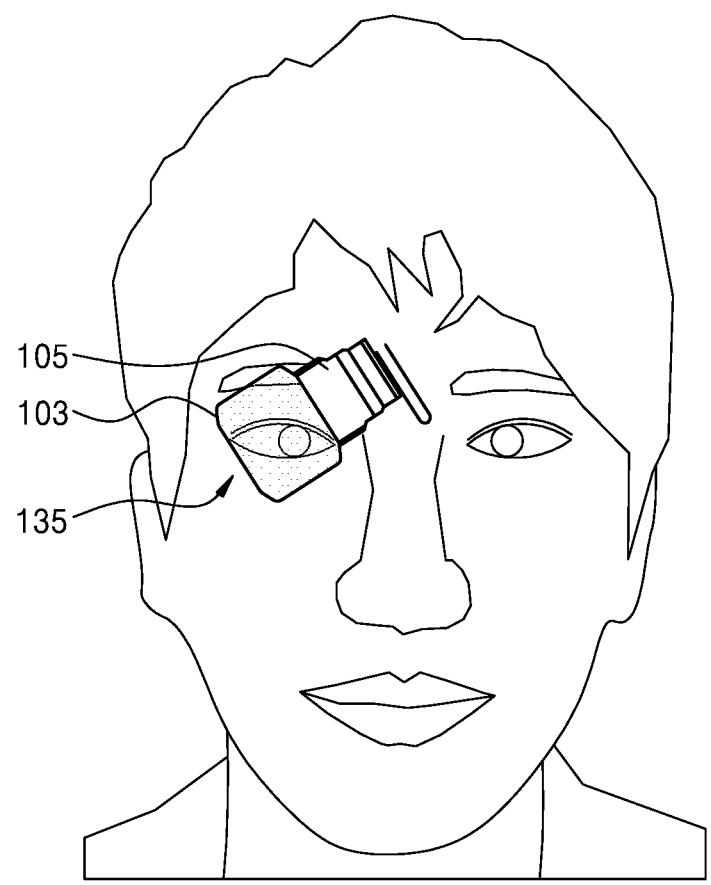
FIGS. 18 to 20 illustrate examples in which an electronic apparatus according to various embodiments is disposed at various positions with respect to a user's eye.
Figure 19:
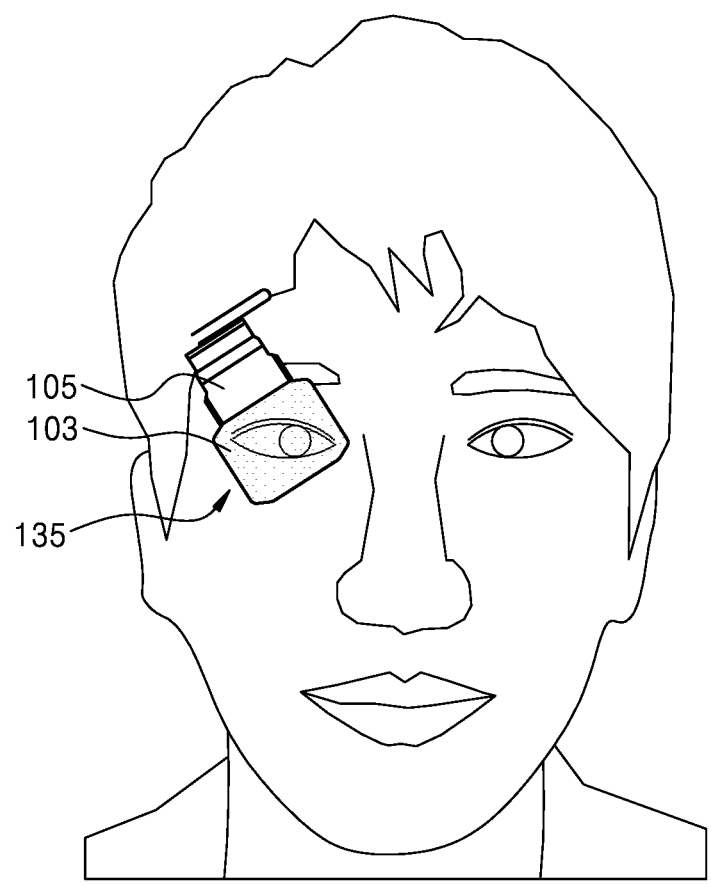
Figure 20:
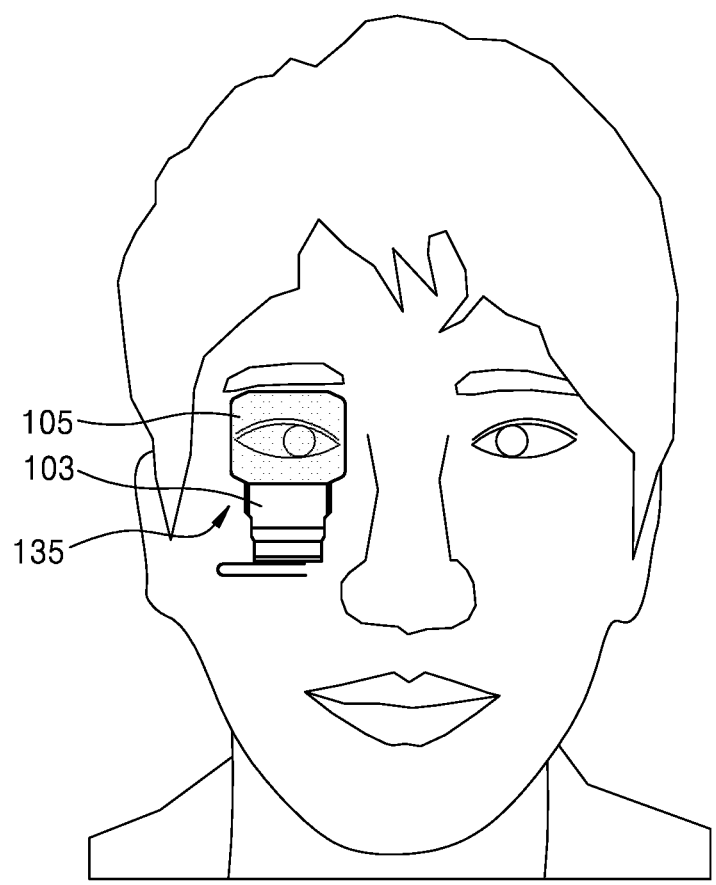

FIGS. 18 to 20 illustrate examples in which the position of the electronic apparatus 135 is variously changed. In FIG. 18, the housing 105 is located at the upper right side of the users eye, in FIG. 19, the housing 105 is located at the upper left side of the user's eye, and in FIG. 20, the housing 105 is located at a lower side of the user's eye.

As the flat semi-transparent mirror 103 of an optical lens assembly according to various embodiments is configured to be flat without a curvature, there is no problem in the optical performance even when a reflection angle of a reflective surface of a flat semi-transparent mirror is changed, and thus the arrangement of an optical lens assembly may be freely changed according to the design of an applied product or the mechanical configuration.

Figure 21:
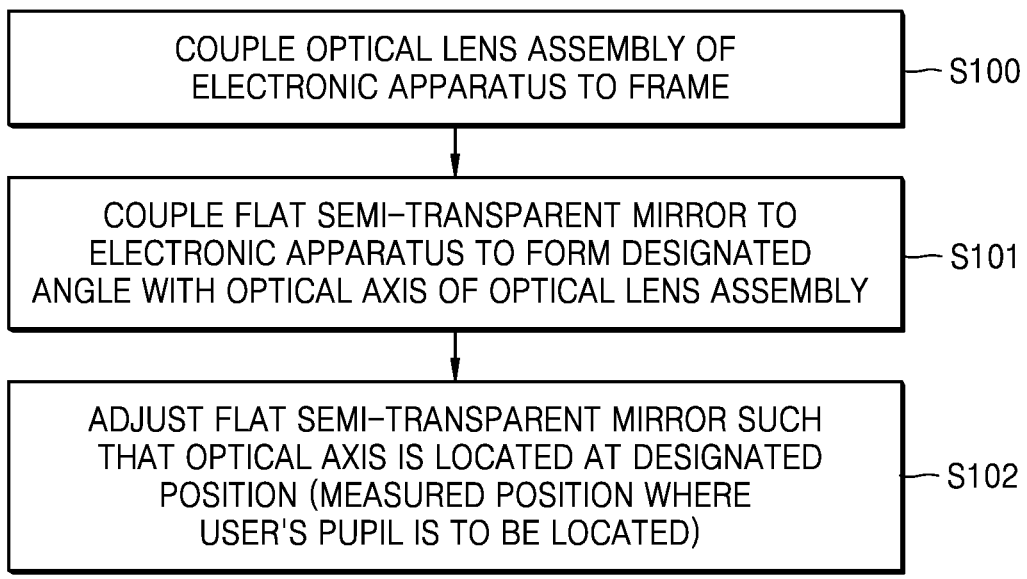
FIG. 21 illustrates an image display method of an electronic apparatus according to an embodiment.

FIG. 21 illustrates a method of combining an optical lens assembly to an electronic apparatus according to an embodiment.

The optical lens assembly of an electronic apparatus is coupled to a frame that may be worn by a user (S100). A flat semi-transparent mirror is coupled to the electronic apparatus to form a designated angle with an optical axis of the optical lens assembly (S101). The flat semi-transparent mirror may be adjusted such that the optical axis is located at a designated position, for example, a measured position where the user's pupil is to be located (S102).

Figure 22:
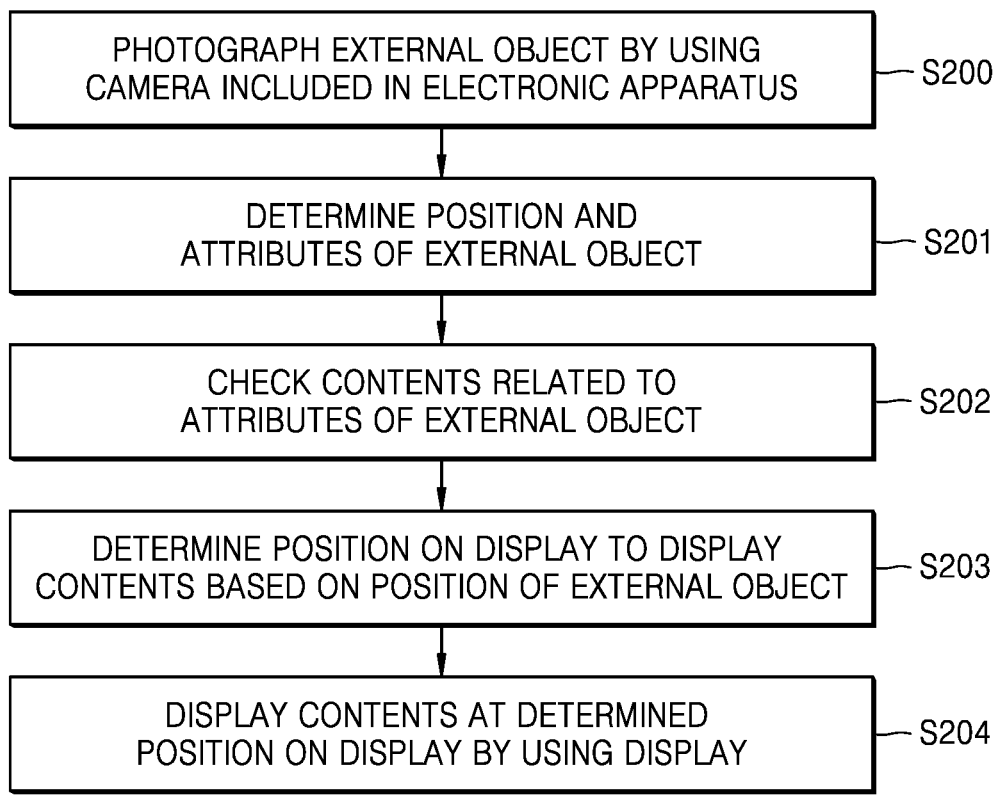
FIG. 22 illustrates an image display method of an electronic apparatus according to another embodiment.

FIG. 22 illustrates a method of displaying an image by an electronic apparatus according to another embodiment.

An external object is photographed by using a camera included in the electronic apparatus (S200). A processor determines the position and attributes of the external object (S201). The processor checks contents related to the attributes of the external object (S202). For example, when the external object is a restaurant, the contents such as the address, telephone number, menu, and the like of the restaurant may be checked. The processor determines the position on a display to display the contents based on the position of the external object (S203). For example, the processor may display the contents at the upper right or the center portion of the display. The contents are displayed at a determined position on the display by using the display (S204). The contents displayed on the display are reflected by the flat semi-transparent mirror and transmitted to the user's eye, and a corresponding external image transmits through the flat semi-transparent mirror and is transmitted to the user's eye. As a result, the user may see an external real object and information about the real object in real time.

Figure 23:
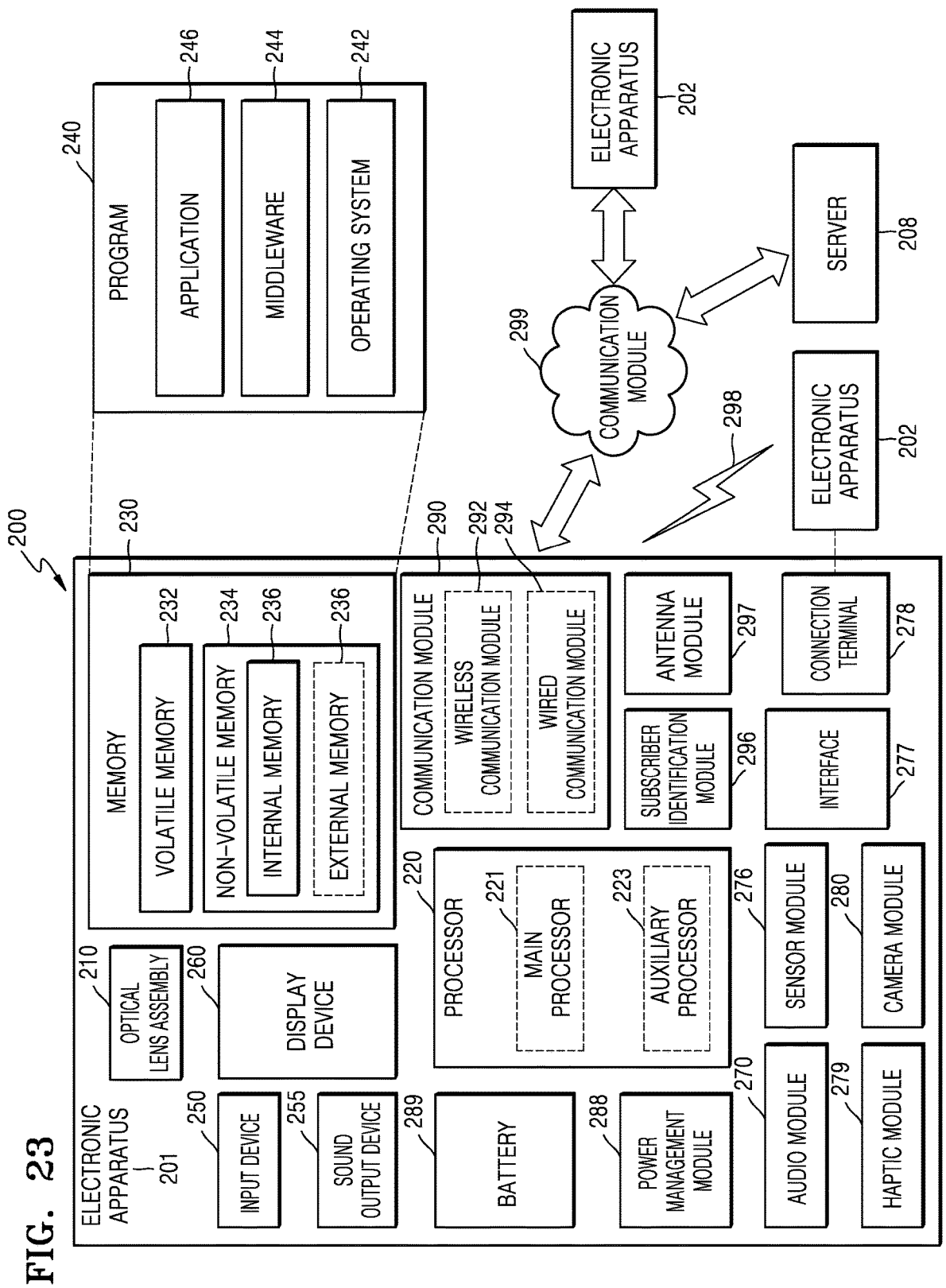
FIG. 23 is a block diagram of an electronic apparatus in a network environment, according to various embodiments.

FIG. 23 is a block diagram of the electronic apparatus 201 in a network environment 200, according to various embodiments. Referring to FIG. 23, in the network environment 200, the electronic apparatus 201 may communicate with an electronic apparatus 202 via a first network 298, e.g., a short-range wireless communication, or communicate with an electronic apparatus 204 or a server 208 via a second network 299, e.g., a remote wireless communication. According to an embodiment, the electronic apparatus 201 may communicate with the electronic apparatus 204 via the server 208. According to an embodiment, the electronic apparatus 201 may include the processor 220, a memory 230, an input device 250, a sound output device 255, a display device 260, an audio module 270, a sensor module 276, an interface 277, a haptic module 279, a camera module 280, a power management module 288, a battery 289, a communication module 290, a subscriber identification module 296, and an antenna module 297. In some embodiment, in the electronic apparatus 201, at least one of constituent elements, e.g., the display device 260 or the camera module 280, may be omitted or other constituent element may be added. In some embodiment, like the sensor module 276, e.g., a fingerprint sensor, an iris sensor, or an illuminance sensor, embedded in the display device 260, e.g., a head mounted display, some constituent elements may be implemented by being integrated. For example, the electronic apparatus 201 may be applied to the electronic apparatus 135 of FIG. 9. The electronic apparatus 201 may include an optical lens assembly 210 according to various embodiments.

The processor 220 may control at least one of other constituent elements, for example, hardware or software constituent element, of the electronic apparatus 201 connected to the processor 220 by executing, for example, software such as a program 240, and perform various pieces of data processing or operations. The processor 220 may load instructions or data received from other constituent elements, for example, the sensor module 276 or the communication module 290, on a volatile memory 232, process the instructions or data stored in the volatile memory 232, and store result data in a non-volatile memory 234. According to an embodiment, the processor 220 may include a main processor 221, for example, a central processing device or an application processor, and an auxiliary processor 223, for example, a graphics processing device, an image signal processor, a sensor hub processor, or a communication processor, which may be operated independently or altogether. Additionally or alternatively, the auxiliary processor 223 may be configured to use less power than the main processor 221, or to be specified to a designated function. The auxiliary processor 223 may be implemented separately from or embedded in the main processor 221.

In this case, the auxiliary processor 223 may control at least some of functions or states related to at least one of constituent elements of the electronic apparatus 201, for example, the display device 260, the sensor module 276, or the communication module 290, for example, instead of the main processor 221 when the main processor 221 is in an inactive state, for example, a sleep state, or with the main processor 221 when the main processor 221 is in an active state, for example, an application execution state. According to an embodiment, the auxiliary processor 223, for example, an image signal processor or a communication processor, may be implemented as a part of other functionally related constituent elements, for example, the camera module 280 or the communication module 290. The memory 230 may store various pieces of data used by at least one of constituent element of the electronic apparatus 201, for example, the processor 220 or the sensor module 276. The data may include, for example, software such as the program 240 and input data or output data regarding instructions related thereto. The memory 230 may include the volatile memory 232 or the non-volatile memory 234.

The program 240 may be stored as software in the memory 230 and may include, for example, an operating system 242, a middleware 244, or an application 246.

The input device 250 may receive instructions or data used for the constituent element of the electronic apparatus 201, for example, the processor 220, from the outside of the electronic apparatus 201, for example, from a user. The input device 250 may include, for example, a microphone, a mouse, or a keyboard.

The sound output device 255 may output a sound signal to the outside of the electronic apparatus 201. The sound output device 255 may include, for example, a speaker or a receiver. A speaker may be used for a general purpose such as multimedia reproduction or recording reproduction, and a receiver may be used for receiving an incoming call. According to an embodiment, the receiver may be implemented separated from or as a part of the speaker.

The display device 260 may visually provide information to the outside of the electronic apparatus 201, for example, to a user. The display device 260 may include, for example, a display, a hologram device, or a projector, and a control circuit for control any of the devices. According to an embodiment, the display device 260 may include a touch circuitry configured to sense a touch, or a sensor circuit, for example, a pressure sensor, configured to measure the strength of a force generated by the touch.

The audio module 270 may convert sound to an electrical signal or reversely an electrical signal to sound. According to an embodiment, the audio module 270 may obtain sound through the input device 250 or output sound through the sound output device 255 or an external electronic apparatus, for example, the electronic apparatus 202 such as a speaker or a headphone, directly or wirelessly connected to the electronic apparatus 201.

The sensor module 276 may detect an operating state, for example, power or temperature, of the electronic apparatus 201, or an external environment state, for example, a user state, and generate an electrical signal or a data value corresponding to a detected state. The sensor module 276 may include, for example, a gesture sensor, a gyro sensor, a barometric pressure sensor, a magnetic sensor, an acceleration sensor, a grip sensor, a proximity sensor, a color sensor, an infrared (IR) sensor, a biological sensor, a temperature sensor, a humidity sensor, or an illuminance sensor.

The interface 277 may support one or more designated protocols to be used for the electronic apparatus 201 to directly or wirelessly connect to the external electronic apparatus, for example, the electronic apparatus 202. According to an embodiment, the interface 277 may include, for example, a high definition multimedia interface (HDMI), a universal serial bus (USB) interface, an SD card interface, or an audio interface.

A connection terminal 278 may include a connector through which the electronic apparatus 201 is physically connected to the external electronic apparatus, for example, the electronic apparatus 202. The connection terminal 278 may include, for example, an HDMI connector, a USB connector, an SD card connector, or an audio connector, for example, a headphone connector.

The haptic module 279 may convert an electrical signal to a mechanical stimulus, for example, a vibration or a movement, which may be recognized by a user through a tactile sense or a sense of movement, or to an electrical stimulus. The haptic module 279 may include, for example, a motor, a piezoelectric device, or an electrical stimulation device.

The camera module 280 may photograph a still image and a video. According to an embodiment, the camera module 280 may include one or more lenses, image sensors, image signal processors, or flashes.

The power management module 288 may manage electric power supplied to the electronic apparatus 201 According to an embodiment, the power management module 288 may be implemented as, for example, at least a part of a power management integrated circuit (PMIC).

The battery 289 may supply electric power to at least one of the constituent elements of the electronic apparatus 201. According to an embodiment, the battery 289 may include, for example, non-rechargeable primary cells, rechargeable secondary cells, or fuel cells.

The communication module 290 may establish a direct communication channel, for example, a wired communication channel, or a wireless communication channel between the electronic apparatus 201 and the external electronic apparatus, for example, the electronic apparatus 202, the electronic apparatus 204, or the server 208, and support a communication through the established communication channel. The communication module 290 may include one or more communication processors that are independently operated of the processor 220, for example, an application processor, and support a direct communication, for example, a wired communication, or a wireless communication. According to an embodiment, the communication module 290 may include a wireless communication module 292, for example, a cellular communication module, a short-range wireless communication module, or a global navigation satellite system (GNSS) communication module, or a wired communication module 294, for example, a LAN communication module, or a power line communication module. Any corresponding communication module of the communication modules may communicate with the external electronic apparatus through the first network 298, for example, a short-range communication network such as Bluetooth, WiFi direct, or infrared data association (IrDA), or the second network 299, for example, a long-range communication network such as a cellular network, the Internet, or a computer network such as LAN or WAN. These various types of communication modules may be implemented by being integrated into one constituent element, for example, a single chip, or as a plurality of separate constituent elements, for example, a plurality of chips.

According to an embodiment, the wireless communication module 292 may identify and approve the electronic apparatus 201 in a communication network such as the first network 298 or the second network 299 by using user information stored in the subscriber identification module 296.

The antenna module 297 may include one or more antennas to transmit a signal or power to the outside, or receive the same from the outside. According to an embodiment, the communication module 290, e.g., the wireless communication module 292, may to transmit a signal to an external electric apparatus or receive the same from the external electronic apparatus through an antenna suitable for a communication method.

At least some of the constituent elements may be mutually connected to each other through a communication method between peripheral devices, for example, a bus, a general-purpose input and output (GPIO), a serial peripheral interface (SPI), or a mobile industry processor interface (MIPI), and exchange signals, for example, instructions or data therebetween.

According to an embodiment, the instructions or data may be transmitted or receive between the electronic apparatus 201 and the electronic apparatus 204 at the outside via the server 208 connected to the second network 299. The electronic apparatuses 202 and 204 each may be apparatuses that are the same as or different from the electronic apparatus 201. According to an embodiment, all or some of the operations performed in the electronic apparatus 201 may be performed in one or more external apparatuses of the external electronic apparatuses such as the electronic apparatuses 202 and 204 or the server 208. According to an embodiment, when the electronic apparatus 201 is supposed to perform a function or a service automatically or in response to a request from a user or another apparatus, the electronic apparatus 201 may request one or more external electronic apparatuses to perform at least part of the function or the service, rather than performing the function or the service, or in addition thereto. The external electronic apparatus having received the request may perform at least part of the requested function or service, or an additional function or service related to the request, and transmit a result of the performance to the electronic apparatus 201. The electronic apparatus 201 may process the result, as it is or additionally, and provide the result as at least part of a response to the request. To this end, for example, cloud computing, distributed computing, or client-server computing technologies may be used.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. An optical lens assembly for an electronic apparatus, the optical lens assembly being worn by a user to see an image generated from a display and comprising:
   at least one negative lens and at least one positive lens arranged along an optical axis of the image; and
   a flat semi-transparent mirror reflecting image light generated from the display and transmitting external real image light,
   wherein the flat semi-transparent mirror is disposed at a final position of a path of the image light generated from the display, one of the at least one positive lens is disposed closest to the flat semi-transparent mirror, and each of the at least one negative lens and the at least one positive lens is a rotationally symmetric lens with respect to the optical axis, and
   wherein the at least one negative lens and the at least one positive lens each comprise a first positive lens, a second negative lens, and a third positive lens, which are arranged along the optical axis toward the flat semi-transparent mirror.

2. The optical lens assembly of claim 1, wherein, when an Abbe number of the second negative lens is V1, and an Abbe number of the third positive lens is V2, the optical lens assembly satisfies a following inequality:

$$25 \leq V1-V2 \leq 40. \qquad \text{<Inequality>}$$

3. The optical lens assembly of claim 1, wherein the first positive lens is a biconvex lens, the second negative lens has a meniscus shape convex toward the flat semi-transparent mirror, and the third positive lens has an exit surface convex toward the flat semi-transparent mirror.

4. The optical lens assembly of claim 1, wherein the at least one negative lens and the at least one positive lens further comprise a fourth positive lens, which are arranged along the optical axis toward the flat semi-transparent mirror.

5. The optical lens assembly of claim 4, wherein, when an Abbe number of the second negative lens is V1, and an Abbe number of the fourth positive lens is V2, the optical lens assembly satisfies a following inequality:

$$25 \leq V1-V2 \leq 40. \qquad \text{<Inequality>}$$

6. The optical lens assembly of claim 4, wherein the first positive lens comprises an exit surface convex toward the flat semi-transparent mirror, the second negative lens is a biconcave lens, the third positive lens has a meniscus shape convex toward the flat semi-transparent mirror, and the fourth positive lens has an exit surface convex toward the flat semi-transparent mirror.

7. An optical lens assembly for an electronic apparatus, the optical lens assembly being worn by a user to see an image generated from a display and comprising:
   at least one negative lens and at least one positive lens arranged along an optical axis of the image; and
   a flat semi-transparent mirror reflecting image light generated from the display and transmitting external real image light,
wherein the flat semi-transparent mirror is disposed at a final position of a path of the image light generated from the display, one of the at least one positive lens is disposed closest to the flat semi-transparent mirror, and each of the at least one negative lens and the at least one positive lens is a rotationally symmetric lens with respect to the optical axis, satisfying a following inequality:

$$1 \leq \left| \frac{T_{(S2-Si)}}{f} \right| \leq 4,$$ <Inequality> wherein $T_{(S2-Si)}$ denotes a distance from the display to the flat semi-transparent mirror, and f denotes a focal length of the optical lens assembly.

8. An electronic apparatus comprising:
a display generating an image;
an optical lens assembly comprising at least one negative lens, at least one positive lens, and a flat semi-transparent mirror that reflects image light of the display and transmits external real image light, which are arranged along an optical axis of the image;
a housing in which the display and the optical lens assembly are mounted; and
a coupling portion movably coupling the flat semi-transparent mirror to the housing,
wherein the at least one negative lens and the at least one positive lens each comprise a first positive lens, a second negative lens, and a third positive lens, which are arranged along the optical axis toward the flat semi-transparent mirror.

9. The electronic apparatus of claim 8, wherein the flat semi-transparent mirror is disposed at a final position of an optical path of the image, one of the at least one positive lens is disposed closest to the flat semi-transparent mirror, and each of the at least one negative lens and the at least one positive lens is a rotationally symmetric lens with respect to the optical axis.

10. The electronic apparatus of claim 8, further comprising a camera, and a processor configured to determine a position and attributes of an external object photographed by the camera, and check contents related to the attributes of the external object, wherein the contents are displayed on the display.

11. The electronic apparatus of claim 8, further comprising a driving portion configured to automatically rotate the flat semi-transparent mirror.

12. The electronic apparatus of claim 8, wherein the electronic apparatus is mounted on a glasses frame.

13. The electronic apparatus of claim 8, satisfying a following inequality:

$$1 \leq \left| \frac{T_{(S2-Si)}}{f} \right| \leq 4,$$ <Inequality> wherein $T_{(S2-Si)}$ denotes a distance from the display to the flat semi-transparent mirror, and f denotes a focal length of the optical lens assembly.

* * * * *